United States Patent
Brisebois

(10) Patent No.: US 9,900,893 B2
(45) Date of Patent: *Feb. 20, 2018

(54) ASYMMETRICAL RECEIVERS FOR WIRELESS COMMUNICATION

(71) Applicant: AT&T Mobility II LLC, Atlanta, GA (US)

(72) Inventor: Arthur Richard Brisebois, Cumming, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/469,451

(22) Filed: Mar. 24, 2017

(65) Prior Publication Data

US 2017/0201996 A1    Jul. 13, 2017

Related U.S. Application Data

(63) Continuation of application No. 14/918,187, filed on Oct. 20, 2015, now Pat. No. 9,621,194, which is a
(Continued)

(51) Int. Cl.
*H04B 1/00* (2006.01)
*H04W 72/04* (2009.01)
(Continued)

(52) U.S. Cl.
CPC ...... *H04W 72/0486* (2013.01); *H04B 1/7097* (2013.01); *H04B 7/0413* (2013.01);
(Continued)

(58) Field of Classification Search
CPC ...... H04B 1/709; H04B 1/707; H04B 1/1036; H04W 72/04; H04W 24/08; H04L 5/0048
(Continued)

(56) References Cited

U.S. PATENT DOCUMENTS 5,546,549 A    8/1996 Barrett et al.
5,809,395 A    9/1998 Hamilton-Piercy et al.
(Continued)

FOREIGN PATENT DOCUMENTS

WO    WO 2009002269    12/2008

OTHER PUBLICATIONS

Office Action dated Feb. 6, 2017 for U.S. Appl. No. 14/857,429, 40 pages.
(Continued)

*Primary Examiner* — Khai Tran
(74) *Attorney, Agent, or Firm* — Amin, Turocy & Watson, LLP

(57) ABSTRACT

Receivers in a mobile device are configured to mitigate receiver overload and fully or nearly-fully utilize available spectrum for communication. Configuration is dictated at least in part by at least one of radio link quality or available receiver specifications, and it can be affected by the mobile device or a base station that serves the mobile device. Receiver configuration includes various spectrally asymmetric receivers that tune respective disparate portions of the available spectrum to maximize utilization thereof in the spectral regions prone to overload conditions. In severe overload conditions, a single receiver can be configured to operate in a frequency band spectrally adjacent to a sub-band that leads to overload conditions when employed for telecommunication. To improve performance, the single receiver configuration can be supplemented with at least one of transmit diversity operation, asymmetric multicarrier spreading, or downlink power boost of asymmetrical multicarrier spreading.

20 Claims, 17 Drawing Sheets

Related U.S. Application Data continuation of application No. 14/502,442, filed on Sep. 30, 2014, now Pat. No. 9,191,036, which is a continuation of application No. 12/508,711, filed on Jul. 24, 2009, now Pat. No. 8,879,602.

(51) Int. Cl.

| | | |
|---|---|---|
| *H04B 1/7097* | (2011.01) | |
| *H04B 7/0413* | (2017.01) | |
| *H04L 5/00* | (2006.01) | |
| *H04W 72/00* | (2009.01) | |

(52) U.S. Cl.
CPC ............ *H04L 5/006* (2013.01); *H04L 5/0048* (2013.01); *H04W 72/005* (2013.01); *H04B 2201/709709* (2013.01)

(58) Field of Classification Search
USPC ............... 375/150, 130, 132, 316, 346, 347; 370/230, 329, 336
See application file for complete search history.

(56) References Cited

U.S. PATENT DOCUMENTS

| | | | |
|---|---|---|---|
| 5,952,922 | A | 9/1999 | Shober |
| 5,970,056 | A | 10/1999 | Brailean et al. |
| 6,175,550 | B1 | 1/2001 | van Nee |
| 6,356,540 | B1 | 3/2002 | Kojiro |
| 6,791,952 | B2 | 9/2004 | Lin et al. |
| 7,206,581 | B2 | 4/2007 | Zhang et al. |
| 7,359,311 | B1 | 4/2008 | Paranjpe et al. |
| 7,415,282 | B2 | 8/2008 | Tillet et al. |
| 7,636,327 | B1 | 12/2009 | Doran |
| 7,912,070 | B1 | 3/2011 | Choksi |
| 8,149,743 | B1 | 4/2012 | Choksi |
| 8,811,240 | B2 | 8/2014 | Chindapol et al. |
| 8,879,602 | B2 | 11/2014 | Brisebois |
| 9,319,210 | B2 | 4/2016 | Choi et al. |
| 9,621,194 | B2 * | 4/2017 | Brisebois ............... H04B 1/006 |
| 9,655,004 | B2 | 5/2017 | Yu et al. |
| 2002/0193146 | A1 | 12/2002 | Wallace et al. |
| 2003/0161343 | A1 | 8/2003 | Ghosh |
| 2004/0198425 | A1 | 10/2004 | Mellone et al. |
| 2004/0213144 | A1 | 10/2004 | Murakami et al. |
| 2005/0181752 | A1 | 8/2005 | Sahota |
| 2006/0025165 | A1 | 2/2006 | Tillet et al. |
| 2006/0056534 | A1 | 3/2006 | Ionescu et al. |
| 2006/0067263 | A1 | 3/2006 | Li et al. |
| 2006/0142021 | A1 | 6/2006 | Mueckenheim et al. |
| 2006/0146750 | A1 | 7/2006 | Chen et al. |
| 2006/0229093 | A1 | 10/2006 | Bhutiani et al. |
| 2006/0256761 | A1 | 11/2006 | Meylan et al. |
| 2007/0239885 | A1 | 10/2007 | Vadlakonda et al. |
| 2008/0037502 | A1 | 2/2008 | Yokoyama |
| 2008/0117859 | A1 | 5/2008 | Shahidi et al. |
| 2008/0174470 | A1 | 7/2008 | Lum et al. |
| 2009/0036062 | A1 | 2/2009 | Tanaka et al. |
| 2009/0180402 | A1 | 7/2009 | Lindoff et al. |
| 2009/0203326 | A1 | 8/2009 | Vesma et al. |
| 2009/0232233 | A1 | 9/2009 | Duan et al. |
| 2009/0296609 | A1 | 12/2009 | Choi et al. |
| 2010/0008332 | A1 | 1/2010 | Balachandran et al. |
| 2010/0034123 | A1 | 2/2010 | Razdan et al. |
| 2011/0007664 | A1 | 1/2011 | Diab et al. |
| 2012/0182952 | A1 | 7/2012 | Stanwood et al. |
| 2013/0083835 | A1 * | 4/2013 | Gupta .................. H04B 7/0417 375/227 |
| 2013/0336147 | A1 * | 12/2013 | Tong .................... H04B 7/0452 370/252 |
| 2015/0003398 | A1 * | 1/2015 | Agrawal ............. H04W 72/082 370/329 |
| 2015/0009865 | A1 | 1/2015 | Sharma et al. |

OTHER PUBLICATIONS

Office Action dated Jun. 6, 2014 for U.S. Appl. No. 13/688,486, 21 pages.
Final OA dated Mar. 15, 2011 for U.S. Appl. No. 12/206,774, 14 pages.
Final OA dated Aug. 23, 2011 for U.S. Appl. No. 12/206,774, 15 pages.
Final OA dated Aug. 23, 2011 for U.S. Appl. No. 12/334,353, 23 pages.
ISR & Written Opinion for International Application No. PCT/US2010/042007, dated Jan. 26, 2011, 17 pages.
3GPP TS 25.308 V7.0.0; Jun. 18, 2009; 3rd Generation Partnership Project; Technical Specification Group Radio Access Network; High Speed Downlink Packet Access (HSDPA); Overall description; Stage 2 (Release 7) 52 pgs.
3GPP TS 25.308 V8.6.0; Jun. 18, 2009; 3rd Generation Partnership Project; Technical Specification Group Radio Access Network; High Speed Downlink Packet Access (HSDPA); Overall description; Stage 2 (Release 8) 63 pgs.
3GPP TS 25.308 V9.0.0; Jun. 18, 2009; 3rd Generation Partnership Project; Technical Specification Group Radio Access Network; High Speed Downlink Packet Access (HSDPA); Overall description; Stage 2 (Release 9) 65 pgs.
3GPP TS 25.308 V7.8.0 (Sep. 2008);Technical Specification; 3rd Generation Partnership Project;Technical Specification Group Radio Access Network; High Speed Downlink Packet Access (HSDPA); Overall description; Stage 2 (Release 7); 51 pgs.
3GPP TS 25.308 V8.3.0 (Sep. 2008);Technical Specification; 3rd Generation Partnership Project;Technical Specification Group Radio Access Network; High Speed Downlink Packet Access (HSDPA); Overall description; Stage 2 (Release 8) 56 pgs.
3GPP TS 36.300 V8.6.0 (Sep. 2008);Technical Specification;3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 137 pgs.
Final Office Action dated Sep. 11, 2013 for U.S. Appl. No. 12/508,711, 28 pages.
Final Office Action dated Oct. 15, 2012 for U.S. Appl. No. 12/508,711, 28 pages.
Nonfinal Office Action dated Feb. 24, 2014 for U.S. Appl. No. 12/508,711, 31 pages.
Nonfinal Office Action dated Mar. 14, 2013 for U.S. Appl. No. 12/508,711, 25 pages.
Nonfinal Office Action dated Apr. 3, 2012 for U.S. Appl. No. 12/508,711, 24 pages.
OA dated Jun. 4, 2012 for U.S. Appl. No. 13/422,608, 20 pages.
Notice of Allowance dated Oct. 8, 2014 for U.S. Appl. No. 13/688,486, 20 pages.
OA dated Mar. 3, 2015 for U.S. Appl. No. 13/421,734, 9 pages.
OA dated Feb. 26, 2015 for U.S. Appl. No. 14/502,442, 17 pages.
OA dated May 11, 2016 for U.S. Appl. No. 14/918,187, 25 pages.
Office Action dated May 15, 2017 for U.S. Appl. No. 14/857,429, 27 pages.
Office Action dated Sep. 8, 2017 for U.S. Appl. No. 14/857,429, 36 pages.

* cited by examiner

ASYMMETRICAL RECEIVERS FOR WIRELESS COMMUNICATION

RELATED APPLICATIONS

This application is a continuation of, and claims priority to each of, U.S. patent application Ser. No. 14/918,187 (now U.S. Pat. No. 9,621,194), filed Oct. 20, 2015, and entitled "ASYMMETRICAL RECEIVERS FOR WIRELESS COMMUNICATION," which is a continuation of U.S. patent application Ser. No. 14/502,442 (now U.S. Pat. No. 9,191,036), filed Sep. 30, 2014, and entitled "ASYMMETRICAL RECEIVERS FOR WIRELESS COMMUNICATION," which is a continuation of U.S. patent application Ser. No. 12/508,711 (now U.S. Pat. No. 8,879,602), filed Jul. 24, 2009, and entitled "ASYMMETRICAL RECEIVERS FOR WIRELESS COMMUNICATION." The entireties of these applications are hereby incorporated herein by reference.

TECHNICAL FIELD

The subject application relates to wireless communications and, more particularly, to configuring receivers in a mobile device to mitigate receiver overload and fully or nearly-fully utilize available electromagnetic radiation spectrum for communication.

BACKGROUND

Utilization of electromagnetic radiation spectrum for telecommunication is regulated, with generally competitive and costly proceedings to license a portion of such spectrum. In addition, spectrum open for licensing bids is limited. Moreover, license-free spectrum also is limited, with substantial power constraints and related regulations. Consequently, wireless service providers strive to efficiently use licensed and open spectrum, developing telecommunication techniques that attempt to increase data rates for a given, specific allocation of the spectrum. Manufacturers of wireless devices continue to design transceivers, and associated circuitry, intended to operate efficiently in demanding conditions such as wireless environments prone to device overload and interference-limited performance. Such development generally occurs within the bounds of commercial viability, e.g., operational and portability convenience, attractive style, and other consumer-appealing features, and product affordability as well. Thus, novel devices are typically the result of a trade-off between advanced, efficient operation and ability to produce substantial consumer adoption; for instance, highly portable user equipment includes receiver filters that exhibit relatively low quality factors and inferior adjacent carrier attenuation. As a result, available EM radiation spectrum is generally underutilized and telecommunication largely remains overload- and interference-limited.

DETAILED DESCRIPTION

Figure 1:
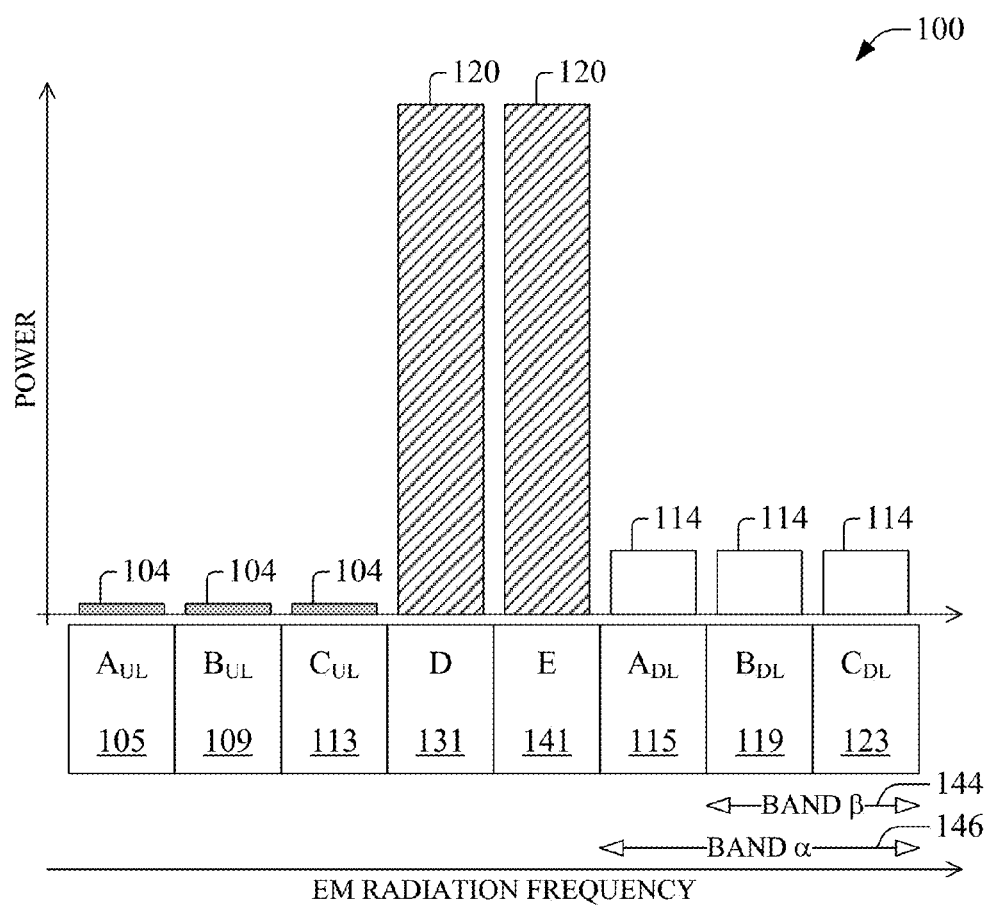
FIG. 1 presents an example power allowance diagram for an illustrative set of electromagnetic (EM) radiation frequency blocks, or sub-bands, which can be utilized for operation of a device, mobile or pseudo-stationary, in accordance with aspects of the subject application.
Figure 1:
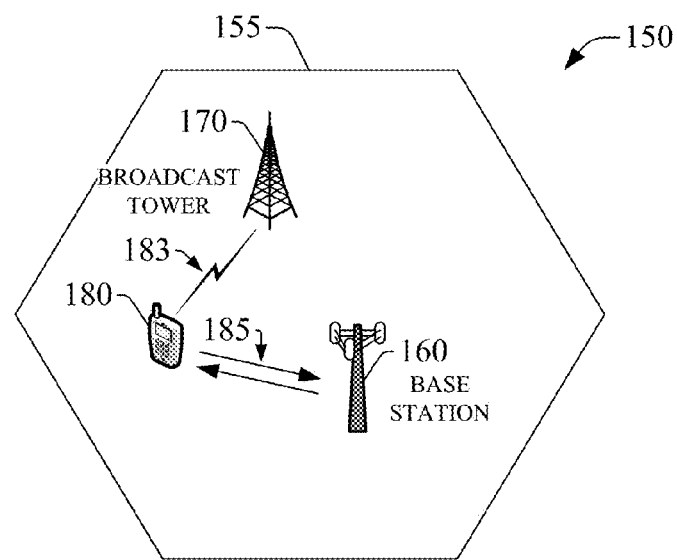

The subject application is now described with reference to the drawings, in which example embodiments are shown and like reference numerals are used to refer to like elements. In the following description, for purposes of explanation, numerous specific details are set forth in order to provide a thorough understanding of the various embodiments. However, the subject disclosure may be embodied in many different forms and should not be construed as limited to the example embodiments set forth herein.

As used in this application, the terms "component," "system," "platform," "interface," "coder," "decoder," "selector," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" can indicate the following contractions: professional-consumer and producer-consumer.

The term "intelligence" as employed herein can have two meanings: (i) it refers to information that characterizes history or behavior of a person or an entity, and to records of commercial and non-commercial activities involving a product or service, or a combination thereof, of the person or entity; and (ii) it refers to the ability to reason or draw conclusions about, e.g., infer, the current or future state of a system or behavior of a user based on existing information about the system or user. Artificial intelligence (AI) can be employed to identify a specific context or action, or generate a probability distribution of specific states of a system or behavior of a user without human intervention.

The subject application provides system(s) and method(s) to configure receivers in a mobile device to mitigate receiver overload and fully or nearly-fully utilize available electromagnetic (EM) radiation spectrum for communication. Such spectrum can be paired or unpaired and it can be prone to receiver overload from high-power signal transmitted in carrier(s) spectrally neighboring the available EM radiation spectrum. Configuration is interference-agile and self-adjusting, or automatic, and it is dictated at least in part by at least one of radio link quality or available receiver specifications. Receiver configuration(s) can be effected by the mobile device or a base station that serves the mobile device. Receiver configuration includes various spectrally asymmetric receivers that tune respective disparate portions of the available EM radiation spectrum to maximize utilization thereof in the spectral regions prone to overload conditions. In an aspect, a receiver configuration can include a receiver that tunes a portion of the EM radiation spectrum utilized for telecommunication of data and signaling dedicated to a specific service or application, and spectral regions for non-dedicated traffic or signaling. In severe overload conditions, a single receiver can be configured to operate in an EM radiation frequency band spectrally adjacent to a sub-band that leads to overload conditions when employed for telecommunication. Alternatively or additionally, the single receiver can operate in an EM radiation frequency band spectrally disjointed from the sub-band in which transmitted signal originates overload condition(s). To improve performance, the single receiver configuration can be supplemented with at least one of transmit diversity operation, asymmetric multicarrier spreading, or downlink power boost of asymmetrical multicarrier spreading.

At least one advantage of the subject application is that it allows for the effective utilization of available EM radiation spectrum, e.g., licensed frequency carrier(s), spectrally adjacent or neighboring to a band or sub-band in which high-power wireless signal is transmitted and that typically is under-utilized or unused. Such an advantage can be exploited for network and user equipment call session processing in order to improve telecommunication performance, e.g., spectral efficiency, radio link budget, or communication quality, while maintaining affordable levels of complexity and cost.

Aspects, features, or advantages of the subject application can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), 3GPP Universal Mobile Telecommunication System (UMTS), Third Generation Partnership Project 2 (3GPP2) Ultra Mobile Broadband (UMB), High Speed Packet Access (HSPA), High Speed Downlink Packet Access (HSDPA), High Speed Uplink Packet Access (HSUPA), or LTE Advanced. Additionally, substantially all aspects of the subject application can include legacy telecommunication technologies.

FIG. 1 presents an example power allowance diagram 100 for an illustrative set of electromagnetic (EM) radiation frequency blocks, or sub-bands, that can be utilized for operation of a device, mobile or pseudo-stationary, in accordance with aspects of the subject application. In the example diagram 100, eight frequency blocks with a common spectral bandwidth are illustrated. Six blocks form three pairs of frequency-division duplex (FDD) sub-bands: $A_{UL}$ 105 and $A_{DL}$ 115; $B_{UL}$ 109 and $B_{DL}$ 119; and $C_{UL}$ 113 and $C_{DL}$ 123. Unpaired blocks D 131 and E 141 are allocated for broadcasting. Uplink (UL) sub-bands can be allowed up to $P_1$ 104 of transmission power, e.g., $P_1$ can range from 3-4 W for typical user equipment. Downlink (DL) sub-bands can be allowed up to $p_2$ 114 of transmission power per frequency unit, e.g., $p_2$=1000 W/MHz. Broadcast power allowance for bands D 131 and E 141 can be $p_3$ 120, e.g., $p_3$=8330 W/MHz. In a particular non-limiting example, the eight frequency sub-bands in diagram 100 can embody the lower 700 MHz band, which spans radio frequencies from 698 MHz to 746 MHz, wherein each frequency block has a spectral bandwidth of 6 MHz.

Features and advantages of the subject application can be exploited for other sub-band configurations that include at least one FDD pair and one frequency block for broadcast. In addition, EM radiation sub-bands for FDD need not have a common spectral bandwidth limited to 6 MHz. In an aspect, sub-bands that can be employed for communication in accordance with aspects or features of the subject application include licensed sub-bands such as Personal Communication Services (PCS) sub-bands, Advanced Wireless Services (AWS) sub-bands, General Wireless Communications Service (GWCS) sub-bands, and so forth; or unlicensed sub-bands, e.g., the 2.4 GHz Industrial, Scientific and Medical (ISM) sub-band or one or more of the 5 GHz set of sub-bands. In addition, aspects of the subject application can be exploited for substantially any or any sub-band spectral bandwidth; for instance, spectral bandwidth can include the standardized bandwidth for Third Generation (3G) LTE radio technology; namely, 1.4 MHz, 1.6 MHz, 3 MHz, 3.2 MHz, 5 MHz, 10 MHz, 15 MHz, or 20 MHz.

Broadcast wireless signal, which can be delivered through blocks D 131 and E 141, can be associated with one or more specific services, e.g., Internet Protocol Television (IPTV) or music broadcast, and can be delivered by a dedicated broadcast tower 170. Data and control can be delivered and received within DL and UL sub-bands, respectively, by a base station 160. Over-the-air wireless links 183 and 185 enable, respectively, exchange of traffic or signaling amongst mobile device 180 and broadcast tower 170 and base station 160. Wireless link 180 comprise a FL only 183 that exploits at least one of sub-bands D 131 or E 141, while wireless link 185 comprises a downlink (DL) and an uplink (UL), and it utilizes sub-bands $A_{DL}$ 115, $B_{DL}$ 119, and $C_{DL}$ 123; and $A_{UL}$ 105, $B_{UL}$ 109, and $C_{UL}$ 113. Broadcast tower 170, base station 160 and mobile device 180 are illustrated within a hexagonal coverage cell 155; however, coverage cells can adopt other geometries generally dictated by a deployment configuration or floor plan, geographic areas to be covered, and so on.

As discussed in greater detail below, mobile device 180 can receive broadcasted signal(s), and data and control through an asymmetric receiver configuration in which a set of one or more receivers that tune disparate portions of the EM radiation spectrum. A filter in each receiver in the set of receivers enables tuning a specific portion of the EM radiation spectrum. Reception of traffic and signaling through asymmetric receiver configuration can be dynamically adjusted to achieve at least one of mitigation of user equipment overload conditions, efficient utilization of available spectrum, dedicated reception of service-specific content; or efficient performance of multiple-input multiple-output (MIMO) operation. While various aspects or features of the subject application are illustrated with two-receiver and three-receiver configurations, such aspects or features can be implemented and exploited in other multi-receiver configurations, e.g., four-receiver, five-receiver, G-receiver with G a natural number. Aspects of features of the subject application can be exploited for network and user equipment call session processing in order to improve telecommunication performance, e.g., spectral efficiency, radio link budget, or communication quality while maintaining affordable levels of complexity and cost.

Figure 2:
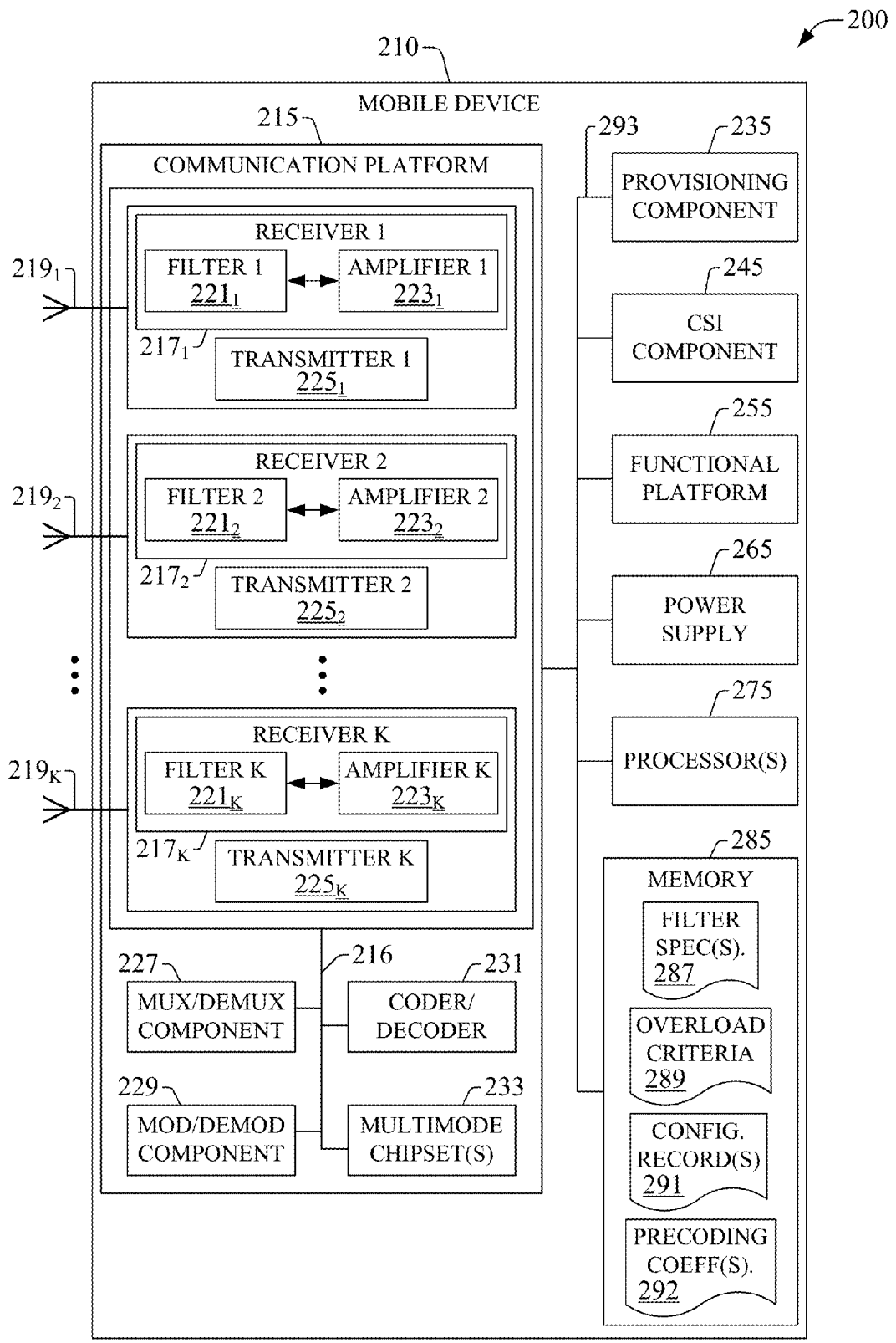
FIG. 2 is a block diagram of an example device that can communicate wirelessly through an asymmetric receiver configured in accordance with aspects described herein.

FIG. 2 is a block diagram of an example embodiment 200 of a mobile device that can communicate wirelessly through asymmetric receivers configured in accordance with aspects described herein. Mobile device 210 can embody, and operate in substantially the same or the same manner as, mobile device 180 or any other mobile device or pseudo-stationary device that can communicate wirelessly as described herein. To enable wireless communication, and transmit and receive data and signaling wirelessly, mobile device 210 includes a communication platform 215, which comprises a set of K transceivers that include respective receivers $217_\lambda$ and transmitters $225_\lambda$, with $\lambda=1, 2 \ldots K$ and K a natural number equal to or greater than unity. Each transceiver includes an antenna $219_\lambda$. One or more receivers $217_\lambda$ can be configured, e.g., by a base station or component(s) therein, to operate in multiple-input multiple-output (MIMO) telecommunication mode. Receivers $217_\lambda$ include respective filters $221_\lambda$ and amplifiers $223_\lambda$, which can be low-noise amplifiers. The filters $221_\lambda$ are installed between antenna $219_\lambda$ and amplifier $223_\lambda$, and tune specific portions of EM radiation spectrum, such portions associated with one or more sub-bands available for telecommunications; e.g., $A_{DL}$ 105, $B_{DL}$ 119, or $C_{DL}$ 123. The portion of the spectrum tuned by a filter $221_\lambda$ sets, at least in part, the bandwidth associated with received path linked to receiver $217_\lambda$. One or more of the filters $217_\lambda$ can be spectrally agile filter(s). For such filters, gain or transmission spectrum can be controlled through application of an external field to or control parameter of one or more component(s) within the agile filter. Logic to control spectral response of an agile filter can be retained in memory 285. In an aspect, such logic can be part of filter specification(s) 287. While inclusion of agile filters within the set of filters $217_\lambda$ can increase complexity of mobile device 210, such filter can provide increased versatility to the set of receivers $217_\lambda$ and mobile device 210. A filter $221_\lambda$ can be a multi-order, or multi-pole, filter of at least one of the following types: Butterworth, Bessel, Chebyschev, Gaussian or elliptic. Matched receivers are those that tune the same or substantially the same portion of the EM radiation spectrum, whereas asymmetric receivers are those that tune disparate portions of the EM radiation spectrum.

Communication platform 215 comprises electronic components and associated circuitry that enable processing and manipulation, e.g., coding/decoding, deciphering, modulation/demodulation, of wireless signal(s) received by mobile device 210 and wireless signal(s) to be transmitted by mobile device 210; the wireless signal(s) modulated and coded, or otherwise processed, in accordance with various radio technology protocols. Components, or functional elements, in communication platform 215 exchange information through a bus 216; information includes data, code instructions, signaling, or the like, and the bus 216 can be embodied in at least one of a system bus, and address bus, or a data bus. The electronic components and circuitry can include the set of K transceivers and component(s) therein, a multiplexer/demultiplexer (mux/demux) component 227, a modulator/demodulator component 229, and a set of one or more chipsets, e.g., multi-mode chipset(s) 233. As indicated above, the transceivers includes receivers $217_\lambda$ and transmitters $225_\lambda$ that can convert signal from analog to digital upon reception, and from digital to analog upon transmission. Receivers $217_\lambda$ and transmitters $225_\lambda$ also can divide a single data stream into multiple parallel data streams, or perform the reciprocal operation; such operations typically conducted in various multiplexing schemes. Functionally coupled to receivers $217_\lambda$ and transmitters $225_\lambda$ is a multiplexer/demultiplexer (mux/demux) component 227 that enables processing or manipulation of wireless signal(s) in time and frequency space or domain. Electronic mux/demux component 227 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 227 can scramble and spread information (e.g., codes) according to substantially any code; e.g., Hadamard-Walsh codes, Baker codes, Kasami codes, polyphase codes, and so on. A modulator/demodulator (mod/demod) component 229 also is a part of communication platform 215, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 200, mod/demod component 229 is functionally coupled to mux/demux component 227 via bus 216. In addition, processor(s) 275 enables, at least in part, mobile device 210 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 215 also includes a coder/decoder 231 that operates on data in accordance with one or more coding/decoding schemes suitable for telecommunication through one or more transceivers $220_\lambda$. When communication platform exploits MIMO, MISO, or SIMO operation, to achieve transmit diversity, coder/decoder 231 can implement at least one of space-time block coding (STBC) and associated decoding; or space-frequency block (SFBC) coding and associated decoding. Coder/decoder 231 also can extract information from data streams coding in accordance with spatial multiplexing scheme. To decode received information, e.g., data or control, coder/decoder 231 can affect at least one of maximum-likelihood (ML) detection, successive interference cancellation (SIC) detection, zero forcing (ZF) and minimum mean square error estimation (MMSE) detection, or the like. In addition, to operate in the manner described herein, coder/decoder 231 can employ, at least in part, mux/demux 227 and mod/demod 229.

A service provider that operates base station 160 can configure, e.g., as part of provisioning of mobile device 210, a set of electromagnetic (EM) radiation frequency bands and a set of radio technologies that communication platform 215 and components therein can exploit for communication. The set of EM radiation frequency bands, also referred to herein as frequency bands, can comprise radio frequency (RF) portion(s) and microwave portion(s) of the EM spectrum, although other spectral regions such as infrared (IR) also can be included. In an aspect, the set of EM radiation frequency bands can include at least one of (i) all or substantially all EM frequency bands licensed by the service provider (e.g., PCS bands, AWS bands, GWCS bands, and so forth); or (ii) all or substantially all unlicensed frequency bands currently available for telecommunication (e.g., the 2.4 GHz Industrial, Scientific and Medical (ISM) band or one or more of the Unlicensed National Information Infra-structure (UNII) bands in the 5 GHz range). It is noted that as part of over-the-air (OTA) upgrades, the service provider can add frequency bands, or frequency carriers therein, to the set of EM radiation frequency bands as such bands or carriers become available for communication, e.g., auctioned for utilization or authorized for free-of-charge utilization. Similarly, as new radio technologies become standardized, or available, the network operator can introduce such technologies in the set of radio technologies that can be utilized for communication.

Additionally, in embodiment 200, multimode chipset(s) 233 can allow mobile device 210 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. In an aspect, multimode chipset(s) 233 can enable, at least in part, communication platform 215 to operate in accordance with standard protocols specific to a telecommunication mode of operation, e.g., LTE-based communication. In another aspect, multimode chipset(s) 233 can be scheduled to operate concurrently (e.g., when K>1) in various modes or within a multitask paradigm in which the multimode chipset(s) 233 operate in a dedicated mode for a specific time interval.

Provisioning component 235 can activate or deactivate one or more receivers $217_\lambda$ in the set of receivers 1 through K to generate a particular receiver configuration. In an aspect, such configuration can accommodate or adhere to fixed transmission constraints, e.g., spectral range for emitted wireless signal(s), of a serving base station or a base station within an active set associated with the mobile device 210. To attain a specific spectral gain, provisioning component 235 also can adjust a value of control parameter $\zeta$ for an agile receiver in the set of receivers $217_1$-$217_K$. Activation or deactivation, e.g., provisioning, of a receiver can be based at least in part on channel state information (CSI), which can be generated by CSI component 245 and supplied to provisioning component 235, or filter specification(s) retained in memory element 287. Thus provisioning component 235 can adapt, or adjust, operation of mobile device 210 in accordance at least in part with a current CSI. In an aspect of the subject application, channel state information includes at least one of one or more radio link metrics or an estimation of one or more channel gain matrix elements $h_{\mu\nu}$, with $\mu=1, 2, \ldots P$ and $\nu=1, 2, \ldots K$, or norm thereof, that compose a P×K channel embodied in wireless link 185. P a natural number that represents a number of antennas at a serving base station. Radio link quality metrics can be represented or quantified through a channel quality indicator (CQI).

In an aspect, provisioning component 235 can contrast received CSI with a set of overload criteria retained in memory element 289 to provision a set of receivers, e.g., $\{217_1, 217_2, 217_{K-1}\}$, that mitigate overload condition(s). In an aspect, overload condition(s) include saturation of one or more amplifiers $223_\lambda$. Provisioning component 235 can select the set of receivers in accordance at least in part with filter specification(s) 287, such as spectral bandwidth(s) and roll-off coefficient(s). Overload criteria 289 includes a set of CSI thresholds $\{C_1^{(th)}, C_2^{(th)}, \ldots C_{L-1}^{(th)}, C_L^{(th)}\}$, with L a positive integer greater or equal than unity, that enable determination of overload conditions and magnitude thereof. As an example, a singleton set of thresholds includes one channel quality indicator (CQI) threshold that establishes a radio link quality below which operation is overloaded. As another example, a set of thresholds can include a first and a second CQI thresholds, e.g., L=2, that distinguish, respectively, non-overload condition from overload condition and overload condition from severely overload condition. Finer resolution to identify overload conditions can be achieved through utilization of larger sets of CSI thresholds; e.g., L≥3.

Additionally or alternatively, provisioning of a filter can be driven at least in part by control data received by mobile device 210. Control data can be generated by a base station, e.g., 160, and can include provisioning data that establishes a specific receiver configuration, e.g., a combination of active and inactive receivers dictated at least in part by a telecommunication operation mode such as spatial multiplexing (SM) MIMO. In an aspect, receiver configurations are asymmetric—disparate configured receivers tune, via respective filters therein, disparate portions of the EM radiation spectrum, as indicated supra. The disparate active receivers need not tune adjacent or partially overlapping portions of the spectrum. As an example, asymmetric receiver configurations can include a pair of receivers with a first receiver that includes a narrow-band filter that tunes band β 144 and a second receiver with a wide-band filter that tunes band α 146. Such first receiver and second receiver can be configured, e.g., by a base station, to operate as a MIMO pair.

Provisioning component 235 can retain a receiver configuration as part of configuration record(s) 291. In addition, the receiver configuration can be conveyed, e.g., through signaling in a control channel, to a base station included in an active set of base stations for mobile device 210, which includes a serving base station such as base station 160. Moreover, when a collected receiver configuration is successfully provisioned, provisioning component 235 can convey an acknowledgement (ACK) indication, e.g., one or more reserved bits in a packet header, a light-payload (e.g., 1-3 bytes) data packet, a predetermined multi-bit word conveyed in a radio frame within a control channel, through signaling delivered via communication platform 215.

In an aspect, CSI component 245 can survey wireless signal(s), e.g., pilot signal(s), within a set of EM frequency bands and determine a radio link quality metric, which allows establishing CSI such as a channel quality indicator (CQI). Surveyed wireless signal(s) also can be employed to estimate $h_{\mu\nu}$. To determine a radio link, or channel, quality metric, CSI component 245 can assess signal strength and noise level for a specific region of the EM radiation spectrum. To at least such end, in an aspect, CSI component 245 operates as a spectral analyzer. CSI component 245 can survey, or scans, wireless signal(s) periodically, with a configurable period established by a network operator or autonomously generated by CSI component 245, e.g., via intelligent component 625; the scan period value can be retained in memory 285, e.g., as part of configuration record(s) 291. Radio link quality metrics can include at least one of received signal strength indicators (RSSIs), received signal code power (RSCP), carrier-over-interference (C/I), carrier-over-noise (C/N), signal-to-noise ratio (SNR), signal-to-noise-and-interference ratio (SNIR), or energy per chip over total received power ($E_c/N_0$). Through suitable measurements of pilot signal(s) strength in a set of time-frequency radio resources or determination of noise therein, CSI component 245 can establish CQIs for at least one of a specific receiver $217_\lambda$ or a specific set of sub-carriers or frequencies within a sub-band, e.g., $A_{DL}$ 115, or band such as band β 144.

In another aspect, CSI component 245 can utilize, at least in part, coder/decoder 231 to generate estimates of channel gain matrix elements $h_{\mu\nu}$ or norm thereof. CSI component 245 can estimate $h_{\mu\nu}$ based at least in part on at least one of received pilot signal(s) or received data symbols. It is noted that norm of $h_{\mu\nu}$ can be estimated through radio link quality metrics described above. CSI component 245 can generate a rank for the channel through the estimated $h_{\mu\nu}$, and convey a rank indicator to a serving base station, e.g., 160, or other base station(s) within an active set associated with mobile device 210. The rank indicator can be conveyed as part of signaling and can be employed by the serving base station to schedule radio resources or select a telecommunication mode. In addition, the rank indicator can ascertain, at least in part, the channel quality. CSI component 245 also can produce a precoding matrix through a singular decomposition of the estimated matrix channel spanned by $h_{\mu\nu}$. Alternatively or in addition, a suitable precoding matrix can be signaled, e.g., through a coefficient retained in memory element 292, based at least in part on estimated $h_{\mu\nu}$ and magnitude of singular values of the associated radio channel matrix; the coefficient identifies a specific precoding matrix.

The set of EM frequency bands surveyed by CSI component 245 can include at least one of (i) all or substantially all EM frequency bands licensed by the service provider (e.g., PCS), AWS, GWCS, and so forth); or (ii) all or substantially all unlicensed frequency bands currently available for telecommunication (e.g., the 2.4 GHz ISM band or one or more of the UNIT bands in the 5 GHz range). In addition, the wireless signal(s) analyzed by CSI component 245 can be received, via communication platform 215, and demultiplexed, demodulated, and decoded in accordance with various radio technologies. Demultiplexing, demodulation and decoding performed, respectively, by mux/demux component 227, mod/demod component 229, and coder/decoder 231. Multimode chipset(s) 233, assisted at least in part by at least one of provisioning component 235 or processor(s) 275, can enable processing and manipulation of the wireless signal(s) in the various radio technologies; multimode chipset(s) can allow demultiplexing, and demodulation and decoding in accordance with telecommunication protocols associated with a radio technology. Such protocols can reside in memory 285. In an aspect, a radio technology can be specified by signaling received OTA in a control channel.

Further to allowing wireless communication of voice or data, mobile device 210 can provide a specific functionality; for instance, device 210 can be a mobile phone, a photography camera, a video camera, a wireless dedicated computer, a navigation device, or the like. Such specific functionality can be supplied primarily through a functional platform 255 that comprises a set of components (not shown) that enable, at least in part, one or more specific functionalities that can complement or supplement wireless communication. As an example, when mobile device 210 is a telephone, functional platform 255 can include functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to, or exchanging data with, a disparate device), a voice coder-decoder; intelligent component(s) that can respond to voice activated command(s); and so on. It should be appreciated that functional platform 255 can exploit applications (not shown) retained memory 285 in order to provide one or more functionalities of mobile device 210.

Functional platform 255 also can include a display interface (not shown) that allows gestures for subscriber-device interaction via at least one of a screen, touch-responsive or otherwise, such as a liquid crystal display (LCD), a plasma panel, a monolithic thin-film based electrochromic display; a set of light emitting elements, e.g., a light emitting diode (LED); a sound interface; or the like. The display interface (not shown) also can render content(s) that control functionality of mobile device 210 as supplied through functional platform 255, or reveal operational conditions of the mobile device 210.

Mobile device 210 includes processor(s) 275 configured to confer, and that confer, at least in part, functionality to substantially any or any component(s) or platform(s), interface(s), selector(s), and so forth, within mobile device 210 in accordance with one or more aspects of the subject application. In embodiment 200, processor(s) 275 is illustrated as external to the various functional elements (e.g., component(s), interface(s), platform(s), selector(s)) of mobile device 210; however, processor(s) 275 can be distributed amongst a plurality of such various functional elements. Processor(s) 275 is functionally coupled to each functional element within mobile device 210 and to memory 285 through bus 293, which can be embodied in at least one of a memory bus, a system bus, an address bus, or one or more reference link(s) or interface(s). In addition, processor(s) 275 can store information in and retrieve information from memory 285, wherein the information is necessary to operate and/or confer functionality, at least in part, to communication platform 215 and at least a portion of component(s) therein; provisioning component 235 and component(s) therein; CSI component 245; functional platform 255 and component(s) therein; as well as other operational components (not shown) of mobile device 210. The information can include at least one of code instructions, code structure(s), data structures, or the like. Processor(s) 275 can execute code instructions (not shown) stored in memory 285, or other memory(ies) functionally coupled to mobile device 210, to provide the described functionality of mobile device 210. Such code instructions can include program modules or software or firmware applications that implement various methods described in the subject specification and associated, at least in part, with functionality of mobile 200.

Memory 285 can retain, at least in part in an application storage(s) (not shown), at least one of data structures (e.g., objects, classes, metadata); code structure(s) (e.g., modules, procedures) or instructions; or substantially any type of software or firmware that processor(s) 275 can execute to provide functionality associated with substantially any or any component(s), platform(s), or functional element(s) within mobile device 210 in accordance with aspects of the subject application. In addition, memory 285 can store network or device information (not shown) such as encoded pilot signal(s) (e.g., encoded sounding reference signal(s)); one or more communication protocol(s) or technical specification(s); code sequences for scrambling or spreading; blind decoding hypotheses; semi-persistent scheduling parameters; frequency offsets, macrocell identifiers (IDs); address book(s); or the like. Moreover, memory 285 can retain content(s) such as multimedia files or subscriber-generated data; security credentials (e.g., passwords, encryption keys, digital certificates, biometric keys such as voice recordings, iris patterns, fingerprints, deoxyribonucleic acid (DNA) profiles); hardware identifying tokens or codes such as at least one of an international mobile subscriber identity (IMSI), a temporary mobile subscriber identity (TMSI), packet TMSI (P-TMSI), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID). It is noted that memory 1675 can include stationary or removable elements such as a subscriber identification module (SIM) card storage, a universal integrated circuit card (UICC) storage, or a removable user identity module (RUIM).

Mobile device 210 also includes power supply 265, which can provision power to one or more components or functional elements that operate within mobile device 210. Power supply 265 can be rechargeable, e.g., it can be embodied in a rechargeable battery. In addition, power supply 265 can include one or more transformers to achieve power level(s) that can operate mobile device 210 and components or functional elements, and related circuitry therein. In an aspect, power supply 265 can attach to a conventional power grid to recharge and ensure mobile device 210 is operational; power supply 265 can include an input/output (I/O) interface (not shown), or connector (not shown), to functionally attach to a conventional power grid. Power supply 265 also can include an energy conversion component (not shown) such as a solar panel or a thermoelectric device or material, which can be external or internal to the mobile device 210, in order to provide additional or alternative power resources or autonomy to mobile device 210.

Figure 3:
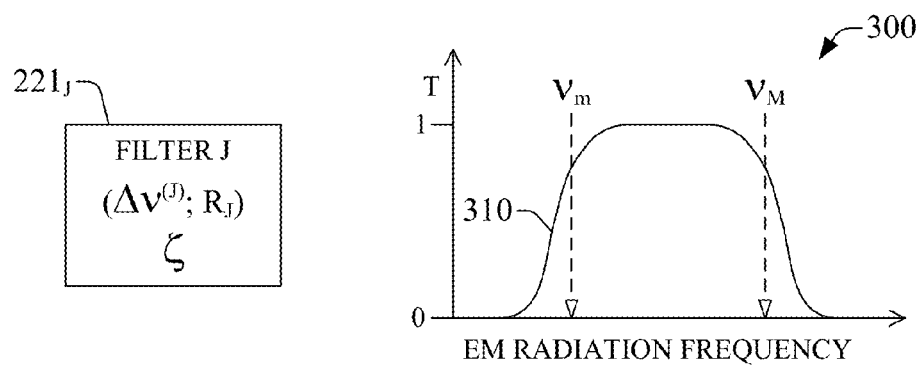
FIG. 3 illustrates an example response of a filter included in a device that exploits asymmetric receiver configuration(s) in accordance with aspects described herein.

Operation of receivers $217_\lambda$ is based at least in part on characteristics of respective filters $221_\lambda$. FIG. 3 illustrates example specification(s) and response of a filter that can be part of an apparatus, such as mobile device 210, that exploits an asymmetric receiver configuration for telecommunication in accordance with aspects described herein. Filter $221_J$, with J a natural number such that $1 \leq J \leq K$, is part of a receiver $217_J$, and can be characterized by at least two specifications: (i) spectral band-pass bandwidth $\Delta v^{(J)}$, and (ii) roll-off coefficient $R_J$. Diagram 300 displays an illustrative transmission (T) spectrum 310, or spectral response, for filter $221_J$. Spectral band-pass bandwidth is defined as the difference amongst a higher pass frequency $v_M$ and a lower pass frequency $v_m$; namely, $\Delta v^{(J)} = v_M - v_m$. Since roll-off $R_J$ is finite, various criteria can be utilized to determine values for $v_M$ and $v_m$; for instance, $v_M$ or $v_m$ can be defined as a frequency at which transmission, or gain, of the filter $221_J$ has decreased from its maximum, e.g., 1 or 100%, by a predetermined value, for example, a 3 dB decrease. In addition, in view of the finite roll-off, filter $221_J$ can tune frequencies above $v_M$ and below $v_m$. As in conventional filters, magnitude of roll-off $R_J$ decreases with increasing the order, or number of poles, of the filter $221_J$.

In a scenario in which filter $221_J$ is spectrally agile, $\Delta v^{(J)}$ can vary based at least in part on a control parameter $\zeta$, which can be determined by operational condition(s), e.g., CSI, of the receiver $217_J$. Magnitude of variation can be dictated by filter material or component(s) thereof. Variation can be intrinsic or extrinsic. Intrinsic variation can be driven by changes in filter spectral response due to changes in properties of the filter material driven by the operational condition(s). Extrinsic variation can be driven by application of an external field that causes, at least in part, variation of the transmission, or gain, properties of the filter material or component(s) therein.

Figure 4A:
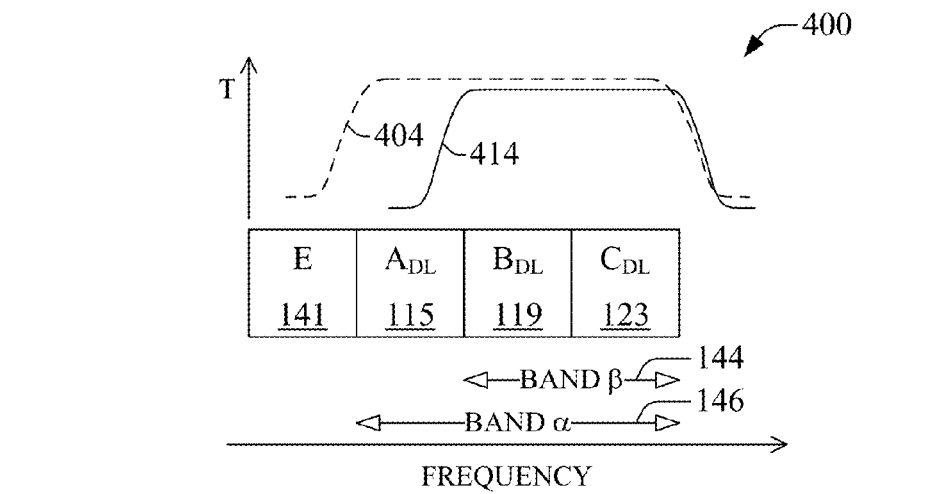
FIGS. 4A-4C display diagrams of multi-filter asymmetric configurations in accordance with aspects disclosed in the subject application.
Figure 4A:
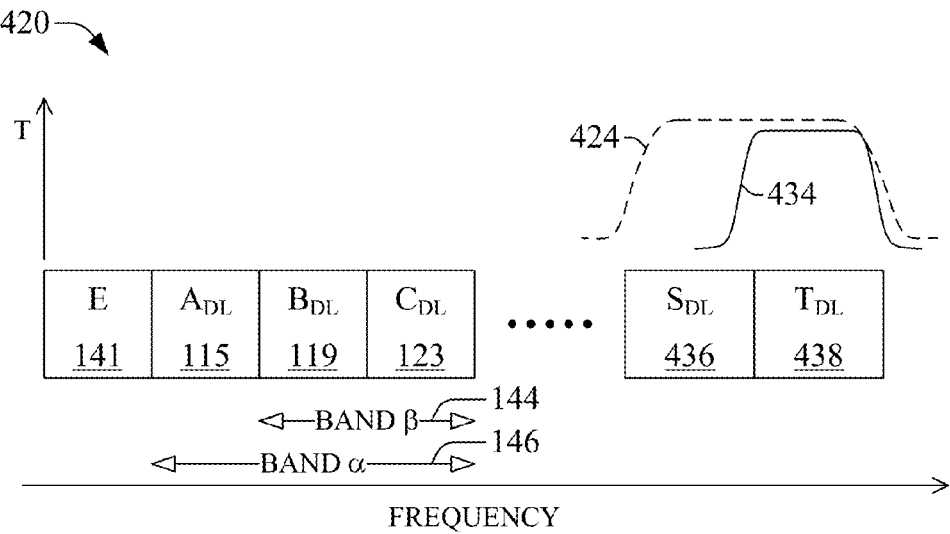

FIG. 4A displays diagrams of illustrative two-filter asymmetric configurations in accordance with aspects disclosed in the subject application. Power allowances for illustrated sub-bands $C_{UL}$ 113, D 131, E 141, $A_{DL}$ 115, $B_{DL}$ 119, and $C_{DL}$ 123 correspond to those presented in FIG. 1 and associated description. With respect to $S_{DL}$ 426 and $T_{DL}$ 438, such frequency blocks can be part of a different frequency band than that including sub-bands $C_{UL}$ 113, D 131, E 141, $A_{DL}$ 115, $B_{DL}$ 119, and $C_{DL}$ 123; in an embodiment, $S_{DL}$ 426 and $T_{DL}$ 438 can be part of the AWS band. In addition, $S_{DL}$ 426 and $T_{DL}$ 438 can be paired with respective UL frequency blocks (not shown), or can be frequency blocks allocated for DL transmission only. Alternatively or additionally, $S_{DL}$ 426 and $T_{DL}$ 438 can be employed for UL and DL communication within a time division duplex scheme. Note that as illustrated $S_{DL}$ 426 and $T_{DL}$ 438 have broader bandwidth than other displayed sub-bands; such scenario can occur $S_{DL}$ 426 and $T_{DL}$ 438 are embodied in AWS sub-band(s) or carrier(s) and $C_{UL}$ 113, D 131, E 141, $A_{DL}$ 115, $B_{DL}$ 119, and $C_{DL}$ 123 are embodied in lower 700 MHz carriers. Each gain spectral response illustrated in diagrams 400 or 420 can correspond to respective filters that are part of respective receivers in a device (e.g., mobile device 210) with wireless communication capability and that utilizes such receivers for telecommunication. In diagram 400, gain spectral response 404 of a first filter tunes a first frequency band α 146 that spans sub-bands $A_{DL}$ 115, $B_{DL}$ 119, and $C_{DL}$ 123, while gain spectral response 414 of a second filter tunes a second narrower frequency band β 144 that includes sub-bands $B_{DL}$ 119 and $C_{DL}$ 123. Gain spectral responses 404 and 414, as well as any other spectral responses illustrated herein, are vertically, mutually off-set for representation clarity. In view of finite roll-off, a first receiver that utilizes the first filter can be overloaded with broadcast signal in frequency sub-band E 141 when a device, e.g., mobile device 210, that utilizes the first receiver is in proximity of a broadcast source (e.g., broadcast tower 170) emitting in block E 141. Accordingly, the device or one or more components therein, e.g., provisioning component 235, can deactivate the first receiver or utilize it in a controlled manner when near such broadcast source. In an aspect, controlled utilization can include inclusion of the first receiver in telecommunication in order to fulfill a bitrate requirement or a specific error rate such as a guaranteed bit error rate (BER) or block error rate (BLER). As described above, the first receiver and the second receiver can be configured, e.g., by a base station, to operate as a MIMO pair.

While the first receiver can be overloaded by a high-power broadcasted signal delivered in sub-band E 141, in a scenario in which the device is not overloaded by the broadcast source signal, the first receiver can advantageously exploit the combined spectral bandwidth of sub-bands $A_{DL}$ 115, $B_{DL}$ 119, and $C_{DL}$ 123. Namely, asymmetric receiver configuration 400 can fully exploit available EM radiation spectrum for DL transmission of data and signaling, as opposed to conventional matched-filter configuration, e.g., overlapping spectral gains 404 and 414, that fails to utilize the $A_{DL}$ 115 portion of the available spectrum and thus limits use of available spectrum even in the absence of high-power, broadcasted wireless signal. Limitation on the utilization of $A_{DL}$ 115 can substantially reduce available capacity for communications that utilize sub-bands $A_{UL}$ 105, $B_{UL}$ 109, and $C_{UL}$ 113, and $A_{DL}$ 115, $B_{DL}$ 119, and $C_{DL}$ 123, illustrated in diagram 100. For instance, when such sub-bands are embodied in the lower 700 MHz band, ADL bandwidth span 6 MHz, which is a substantive portion of the band capacity. It should be noted that matched-filter configurations are conventionally employed to mitigate overload at the expense of unused available spectrum. At least one advantage of telecommunication through a wider bandwidth afforded by the combined sub-bands $A_{DL}$ 115, $B_{DL}$ 119, and $C_{DL}$ 123 is increased capacity, and efficiency and performance, particularly in radio technologies such as 3GPP LTE, which can operate in various, increasingly larger bandwidths. The second receiver that includes the second filter, with gain spectral response 420, is unaffected by broadcast signal in frequency block E 141. Accordingly, when a device (e.g., mobile 180) that employs the second filter in a receiver is close to a broadcast source (e.g., broadcast tower 170) emitting in block E 141, the receiver with the second filter becomes the primary receiver of the device.

In alternative or additional asymmetric receiver configuration 420, for a device that utilizes receivers that include respective filters with gain spectral responses 424 and 434, overload is removed in view of the spectral splitting between frequency block E 141 and sub-bands $S_{DL}$ 426 and $T_{DL}$ 438. Configuration 420 can be established by a component within the device, e.g., provisioning component 235, when receivers, and respective filters therein, with tuning characteristics 424 and 434 are available to such device. A first receiver and a second receiver with tuning characteristics 424 and 434, respectively, can be configured, e.g., by a base station, to operate as a MIMO pair. While gain spectral responses 424 and 434 are illustrated as asymmetric, it should be appreciated that matched gain spectral responses also can be configured and utilized in view that receivers that collect signal transmitted in frequency blocks $S_{DL}$ 426 and $T_{DL}$ 438 are unaffected by overload condition(s) originating from broadcast signal in block E 141. In addition, it should be appreciated that in receiver configuration 420 or a related alternative or additional matched receiver configuration, UL traffic and control can be transmitted via one or more of sub-bands $A_{UL}$ 105, $B_{UL}$ 109, or $C_{UL}$ 113.

In mobile device 210, when K=4 and gain spectrum of four filters $221_1$-$221_4$ have respective spectral responses 404, 414, 424, and 434, provisioning component 235 can switch from asymmetric receiver configuration 400 to configuration 420, and vice versa, based at least in part on available channel state information and overload condition(s) determined there from. For instance, when a receiver in asymmetric configuration 400 is overloaded by transmissions in block E 141, provisioning component 235 can activate configuration 420, and deactivate it in favor of re-activation of configuration 400 when overload condition(s) cease to be present.

In a MIMO pair formed by the first receiver and second receiver in configuration 400, and in the absence of receiver overload, MIMO weighting can utilize primarily band α 146, to exploit fully the available spectrum. Upon onset of overload condition(s) or at moderate overload condition(s), for example the device that utilizes the MIMO pair is located near a broadcast tower, e.g., 170, radio link quality of receive path associated with the first receiver degrades. In response, a base station that serves the device can adjust MIMO weighting off frequency block $A_{DL}$ 115 and shift it towards band β 144, which can result in wireless signal, e.g., traffic and signaling, that can be received by a first and second receive paths associated, respectively, with the first and second receivers. When the first receiver, which includes a broad band-pass filter, is severely overloaded, CSI associated with such receiver can reveal substantively inferior radio link quality than that estimated for the second receiver that includes the second filter with narrower gain spectral response. Therefore, a base station that serves the device that utilizes the first and second receivers can schedule radio resources in accordance with the largely disparate CSI values amongst such receivers. For example, MIMO weighting associated with operation of the first and second receiver in the MIMO pair can favor the second, narrower bandwidth receiver and frequency assignments can be confined or substantially confined to frequencies tuned by the second, narrower band-pass filter. Accordingly, MIMO operation switches to MISO operation, wherein the device receives traffic and signaling via a single receiver that tunes a single frequency band; namely, the second narrower bandwidth receiver that tunes band β 144. While such MISO operation can be sub-optimal with respect to telecommunication quality and efficiency, effects of sub-optimality are offset by gains in telecommunication performance in moderately- or non-overloaded condition(s), and can be mitigated through various complementary techniques such as the following. Transmit diversity, wherein various transmit paths transport redundant data streams towards the single receiver; asymmetrical multicarrier spreading in which additional carrier(s) unaffected by overload condition(s), e.g., frequency block(s) $S_{DL}$ 436 or $T_{DL}$ 438, are added to transport at least a portion of all transmissions in the downlink, with suitable receivers provisioned to collect at least the portion of all transmissions; or carrier-specific DL power boost for asymmetrical multicarrier spreading.

Figure 4B:
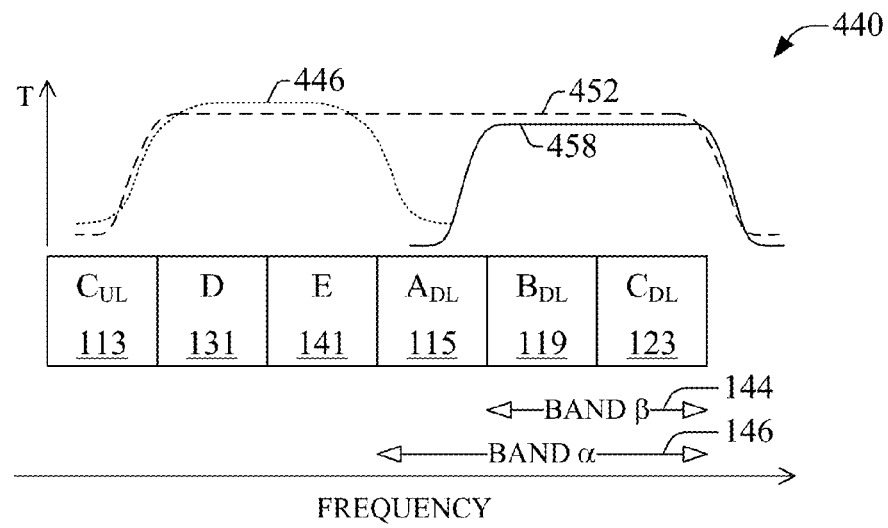

FIG. 4B displays a diagram of an example three-filter asymmetric configuration 440 in accordance with aspects disclosed in the subject application. Such configuration can be exploited to reduce cost and complexity of devices that can consume dedicated content from specific broadcast services or applications. Configuration 440 can be realized in a device such as mobile device 210 that includes at least three receivers, e.g., K≥3, for wireless communication. Spectral response 446 of a first filter spans broadcast sub-bands D 131 and E 141; spectral response 452 of a second filter covers a wide frequency band that includes broadcast bands D 131 and E 141, and downlink sub-bands $A_{DL}$ 115, $B_{DL}$ 119, and $C_{DL}$ 123; and spectral response 458 of a third filter spans frequency sub-bands $B_{DL}$ 119, and $C_{DL}$ 123. The first filter with spectral response 446 can be part of a dedicated, first receiver that collects wireless signal from a specific broadcast service or application, e.g., IPTV, or terrestrial or satellite radio content, when the device that includes the dedicated receiver executes and application that consumes data or signaling from the specific broadcast service or application. Such first filter is unaffected by wireless signal(s) transmitted in sub-bands $B_{DL}$ 119 and $C_{DL}$ 123. The second filter with spectral response 452 can be part of a second receiver employed for collection of broadcast wireless signal and DL unicast signal. The second receiver can be employed in conjunction with a third receiver that includes the third filter to form a MIMO pair telecommunicate unicast traffic and control when strength of broadcast signal does not result in overload condition(s), e.g., a device that utilizes the second filter as part of one of its receivers is located at a distance from the broadcast tower such that received power is sufficiently low so as not to cause overload of a receiver that utilizes the second filter. Telecommunication of unicast data and signaling can exploit PRBs or frequency resources within at least one of band β 144 or band α 146; a base station that serves the device that utilized the second and third receiver can grant such radio resources.

With respect to signal broadcasted in frequency blocks D 131 and E 141 and associated with a dedicated wireless service or application, the second receiver and first, dedicated receiver can form a MIMO pair, and enable MIMO reception of broadcasted traffic and content through P×2 receive paths. A base station can receive an indication from a mobile device that an application or service that consumes broadcasted data and control has been launched, and allocate radio resources for signal reception that are primarily confined to sub-bands D 131 and E 141.

Multi-purpose utilization of the second receiver, or receive path formed there from, incorporating the second filter can thus lessen operation complexity of the device since the second receiver can collect traffic and control linked to the specific broadcast service or application, and regular call session(s). Cost of the device that utilizes the multi-purpose second receiver in combination with the first, dedicated receiver can be reduced as compared with conventional devices that communicate wirelessly through 3GPP LTE protocol(s) or other radio technology(ies) that incorporate MIMO telecommunication, and include dedicated player(s) for specific broadcast wireless services, since such conventional devices would typically utilize an additional receiver to operate the player(s) in MIMO configuration.

It is noted that since roll-off of the first and second filters are such that the filter can tune signal(s) from UL sub-band $C_{UL}$ 113, a first receiver and a second receiver that utilize, respectively the first and second filters can be overloaded by uplink signal(s) transmitted from a device, e.g., 210, that utilizes block $C_{UL}$ 123 and executes an application that receives broadcast signal in sub-bands D 131 or E 141. Thus, to mitigate such overload conditions, radio resources for telecommunication, e.g., physical resource block(s) (PRB(s)), granted to the device can avoid sub-band $C_{UL}$ 123 and include alternative frequency block(s) instead; such alternative frequency block(s) (not shown in FIG. 4) can include frequency sub-bands that can be detected and processed by one or more receivers within the device.

Figure 4C:
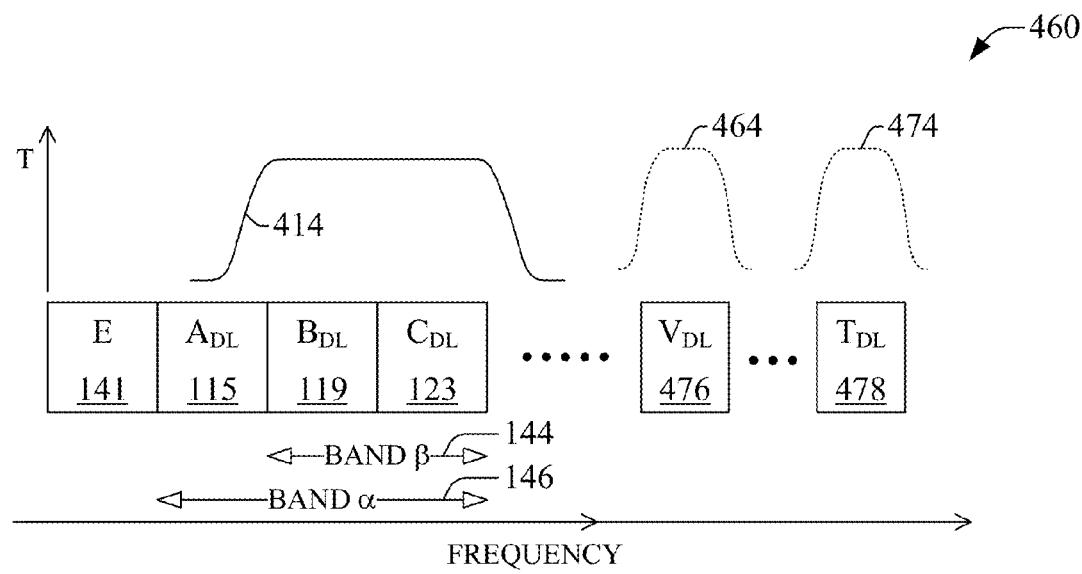

With respect to FIG. 4C, an additional or alternative three-filter asymmetric configuration 460 is displayed. Such configuration 460 can be realized in a device, e.g., mobile device 210, that includes at least three receivers, e.g., K 3, for wireless communication. A component within the device, e.g., provisioning component 235, can effect configuration 460 in response to overload condition(s) that can arise from high-power signal broadcasted in frequency block E 141 and detected by a first receiver that utilizes a first filter that tunes the broadcasted signal due to finite roll-off (see, FIG. 3), or non-ideal spectral attenuation. In configuration 460, two receivers are provisioned to augment the overloaded device; the activated receivers include respective filters, one of the filters can tune frequency block $V_{DL}$ 476 and the other one can tune frequency block $T_{DL}$ 478. As illustrated, such frequency blocks can have bandwidth(s) that are different from the bandwidth(s) of sub-bands $C_{UL}$ 113, D 131, E 141, $A_{DL}$ 115, $B_{DL}$ 119, and $C_{DL}$ 123; in an embodiment, $S_{DL}$ 426 and $T_{DL}$ 438 can be part of the AWS band. Receivers that utilize filters with gain spectral responses 464 and 474 are unaffected by overload condition(s) originated from high-power signal broadcasted in sub-band E 141, or D 131 (not shown). Accordingly, such receivers in configuration 460 can secure at least a portion of DL traffic and signaling directed to the device that exploits configuration 460 for communication. Configuration 460 can be utilized based at least in part on available channel state information and overload condition(s) determined there from. As the device recovers from overload condition(s), a two-filter asymmetric configuration, such as configuration 420, can be activated and receivers that tune frequency blocks $V_{DL}$ 476 and $T_{DL}$ 478 can be deactivated. Alternatively or additionally, a four-receiver, or four-filter, asymmetric configuration (not shown) accomplished through activation of configuration 420 and receivers that tune blocks $V_{DL}$ 476 and $T_{DL}$ 478 can be utilized when the device is not overloaded and is located in close proximity of a serving base station. As overload condition(s) resurge, configuration 460 can be re-activated. A provisioning component, e.g., 235, can activate or deactivate asymmetric configuration 460.

Addition of carrier(s) to a telecommunication band, or multi-carrier spreading, can be advantageously exploited when user equipment served by a sector, e.g., a 3GPP LTE sector, is particularly prone to overload. In an aspect, when the UE is likely to be overloaded due to transmission of broadcasted signal in sub-bands D 131 and E 141 from a high-power broadcaster, e.g., 170, at the edge of a cell that includes the serving sector, a base station or a component therein, e.g., scheduler 725, can establish one of frequency blocks $V_{DL}$ 476 and $T_{DL}$ 478 as a high power DL carrier to supplement DL gaps, which can be DL sub-bands such as $A_{DL}$ 115 that are underutilized or non-utilized in overload condition(s). In such scenario, an UL sub-band paired to at least one of band α 146 or band β 144, or carrier(s) thereof, can be employed as anchor carrier and conduit for transmission of control data, while the one of frequency blocks $V_{DL}$ 476 and $T_{DL}$ 478 AWS can be utilized to deliver the majority or substantially all of downlink user data. In asymmetric multicarrier telecommunication, an anchor carrier is the primary frequency block employed for telecommunication of traffic and control, and such anchor carrier is generally augmented with additional carrier(s) or sub-band(s) to increase capacity.

Figure 5:
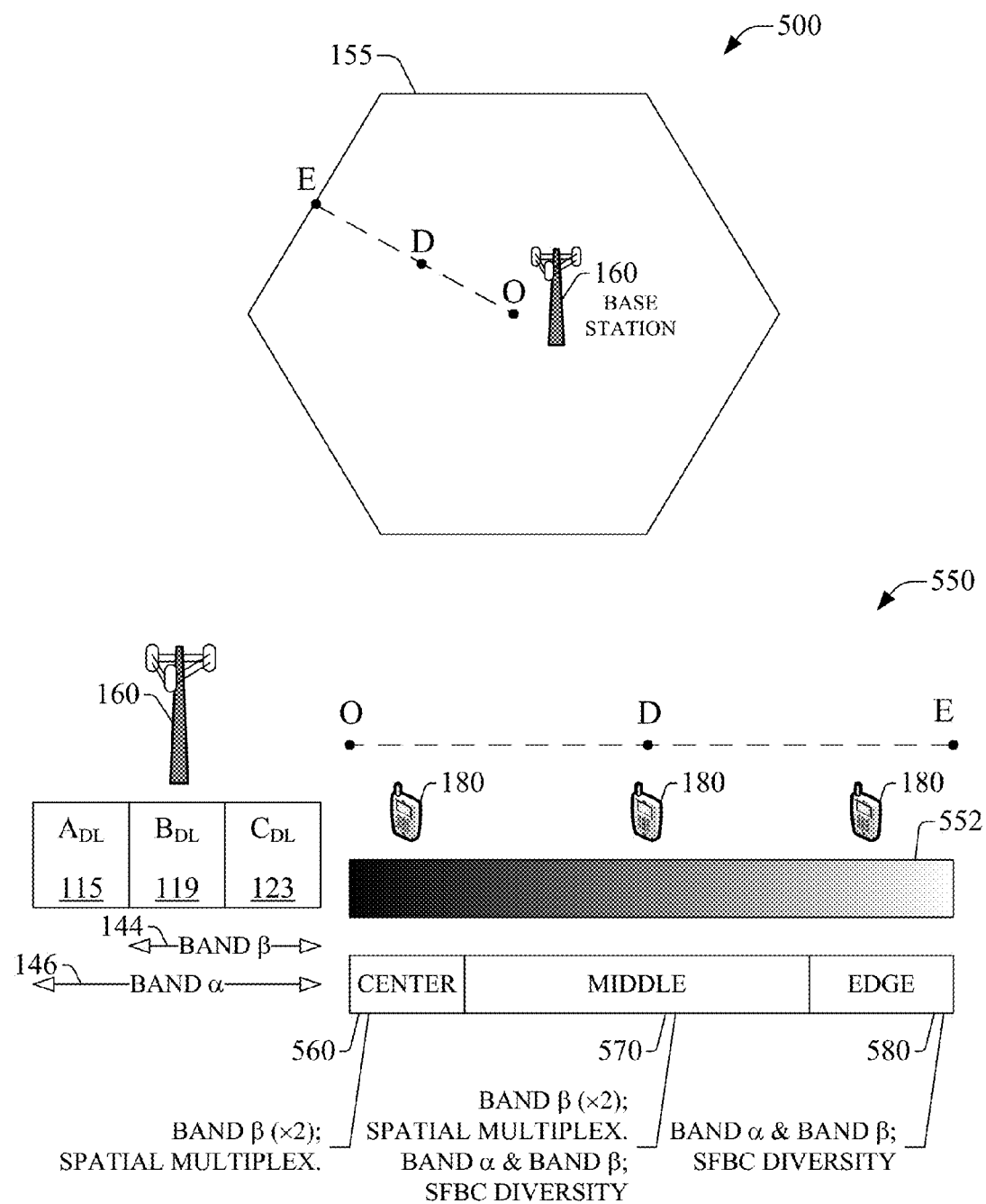
FIG. 5 illustrates a diagram of operation mode of a device in various locations within a coverage cell in accordance with aspects described herein.

The multiple asymmetric receiver configurations described supra can be utilized for communication in a device, e.g., mobile device 210, based at least in part on location of the device within a wireless coverage sector or cell and relative position with respect to a serving base station, e.g., 160, and a broadcasting tower, e.g., 170. FIG. 5 illustrates a diagram of operation mode of such a device in various locations within a coverage cell in accordance with aspects described herein. In example diagram 500, base station 160 resides near center of coverage cell 155 and delivers data or control signal(s) through band α 146, which spans sub-bands $A_{DL}$ 115, $B_{DL}$ 119 and $C_{DL}$ 123. Due to propagation and path loss, power of transmitted wireless signal decreases as distance from base station 160 increases. As displayed in diagram 550, block 552 represents decreasing power from cell 155 center O to mid-cell reference location D and cell 155 edge boundary E with a gradient of black tones: Black represents the highest power at cell center while white represents the lowest transmitted power at cell edge boundary. Characteristic regions, e.g., center, middle, or edge, within cell 155 along line $\overline{OE}$ can be determined based at least in part on magnitude range(s) of transmitted power of wireless signal. Namely, cell center 560 can be the region with the largest power magnitude range and variation thereof; middle cell 570 can be the region with moderate to low power and lower variation thereof; and cell edge 580 can be defined as the region with lowest power magnitude variation in addition to geographical boundary of cell 155. Boundary(ies) of center 560, middle 570, and edge 580 can be specified through selected cutoffs of transmitted power magnitude; selection can be specific to a coverage cell (e.g., 155) and determined by a network operator. Alternatively or additionally, boundary(ies) of cell regions can be defined according to channel quality conditions, e.g., magnitude of UL or DL CQI(s); accordingly, cell regions can be different for UL than DL.

As discussed supra, a first wide band-pass filter and second narrow band-pass filter in respective receivers in a dual asymmetric receiver configuration, such as configuration 400, can be employed as a MIMO pair. When the wide band-pass filter is not overloaded, and in middle-cell or center-cell conditions, as established through channel quality condition(s), DL MIMO spatial multiplexing can be applied utilizing frequency blocks $B_{DL}$ 119 and $C_{DL}$ 123 (band β 144), which can be supported, e.g., signal transported therein can be detected, by the first and second receivers in the dual asymmetric configuration within mobile 180. In an aspect, a scheduler component within a service base station can confine frequency assignments for DL communication to band β 144. Based at least in part upon measurement and reporting of similar CSI, e.g., CQI(s), for each of the receivers, MIMO weighting can be substantially uniform. Spatial multiplexing maximizes or nearly-maximizes throughput of the serving base station.

Alternatively or additionally, when the first wide band-pass filter is not overloaded and in middle-cell or cell-edge conditions, the first wide band-pass filter paired with the second narrow band-pass filter can be exploited in transmit diversity with Space Frequency Block Coding (SFBC). In such transmit diversity telecommunication mode, radio resources, e.g., PRBs, in frequency block $A_{DL}$ 115 are utilized for redundant transmissions in conjunction with frequency resources in sub-bands $B_{DL}$ 119 and $C_{DL}$ 123. In the dual-receiver asymmetric configuration that includes the first wide band-pass filter and the second narrow band-pass filter, e.g., configuration 400, PRBs in sub-bands $B_{DL}$ 119 and $C_{DL}$ 123 can be received by both receivers in UE 180; however, block $A_{DL}$ 115 PRBs can be received by the receiver with the broader bandwidth filter. Such asymmetric dual-receiver configuration suppresses receiver diversity for PRBs in frequency block $A_{DL}$ 115; however, such lack of receiver diversity is offset or mitigated by reduced interference, or interference diversity gain. Namely, interference is spread over a larger spectral bandwidth: $A_{DL}$ 115, $B_{DL}$ 119 and $C_{DL}$ 123. Block $A_{DL}$ 115 PRBs exhibit less interference because such radio resources are not employed for spatial diversity traffic but are utilized by UE 180 in SFBC transmit diversity mode of operation. Reduced interference in middle-cell or cell-edge condition(s) provides higher channel quality, which enables utilization of higher modulation and coding schemes (MCSs), with ensuing increased telecommunication efficiency, e.g., lower latency, and bitrates, or improved link budget. Based at least in part upon measurements conducted by a component in a device that exploits asymmetric configuration receivers, and reports of similar CSI supplied by the component, e.g., CQI report(s), for each of the receivers, MIMO weighting can be substantially uniform for the first and second receiver.

The foregoing modes of operation also can be implemented when base station 160 transmits wireless signal(s) only in band β 144. Such DL transmission scenario affects primarily MIMO communication in SFBC diversity mode.

Figure 6:
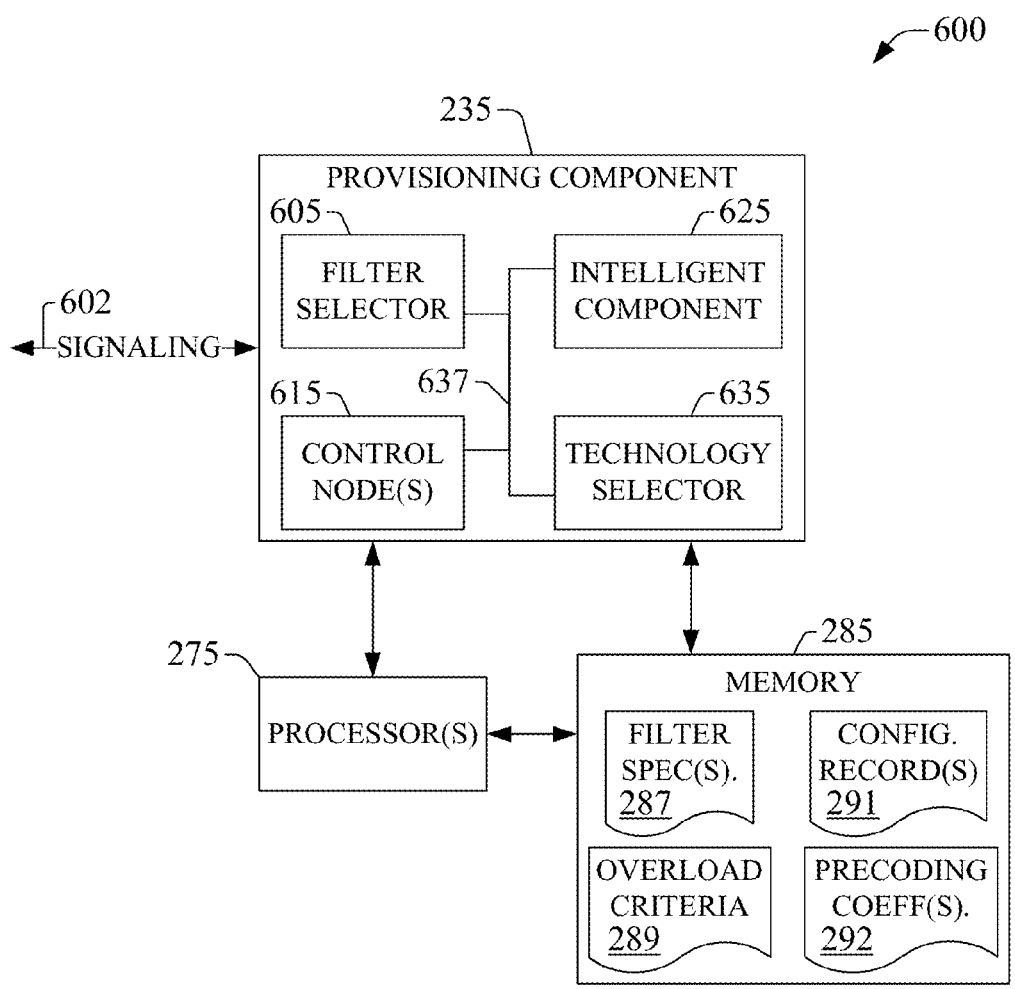
FIG. 6 displays an example embodiment of a provisioning component that is part of a device in accordance with aspects of the subject application.

FIG. 6 displays an example embodiment 600 of a provisioning component 235 in accordance with aspects of the subject application. A technology selector 635 can configure communication platform 215 to operate in a predetermined frequency band and in accordance with a specific radio technology. In addition, technology selector 635 can deliver an indication to filter selector 605 to provision, e.g., activate, a specific set of receivers based at least in part on a selected radio technology and associated EM radiation frequency bands.

As described above, for a configured radio technology, based at least in part on CSI received, as part of signaling 602, filter selector 605 can activate or deactivate utilization of a particular filter $221_\lambda$. In an aspect, as described above, filter selector 605 can compare CSI received as part of signaling 602 against overload criteria 289 to determine a set of filters $221_\lambda$ to be activated or deactivated. In an aspect, activation of a set of filters $221_\lambda$ can be conveyed to communication platform 215 via a M-bit word, with M a natural number, within signaling 602; for instance, an active receiver, or filter therein, can be indicated with a bit set to "1" and an inactive receiver with a bit set to "0." Additionally or alternatively, filter selector 605 can configure, at least in part, an agile filter within the set of filters $221_\lambda$ to operate in a specific spectral bandwidth with a particular roll-off coefficient. To configure the agile filter, filter selector 605 can exploit one or more control node(s) 615 that can adjust a control parameter that determines a physical property of the agile filter material, and thus its band-pass characteristics, or activates one or more components associated with the agile filter and that determine operation thereof. A component associated with the agile filter can be a functional element internal to the agile filter or external and functionally coupled thereto.

Intelligent component 625 can affect a cost-benefit analysis of configuring an agile filter versus deactivating the agile filter and telecommunicating without reliance there from, and supply filter selector 605 with an indication to proceed with or defer adjustment of such agile filter. In addition, intelligent component 625 can collect historical data on received CSI and ensuing filter activation or deactivation to determine overload condition trends and filter selection patterns in order to predict filter configuration(s) that mitigate overload conditions. In an aspect, intelligent component 625 can retain historical CSI data and filter selection data in memory 285; historical filter configuration(s) can be stored in configuration record(s) 291. Intelligent component 625 also can enable CSI component 245 to autonomously determine a period for scanning a wireless channel based upon features or patterns of temporal or spatial variation thereof, as revealed through historical CSI data. To at least such end(s), intelligent component 625 can exploit artificial intelligence (AI) methods to infer (e.g., reason and draw a conclusion based upon a set of metrics, arguments, or known outcomes in controlled scenarios) suitable filter configuration(s) or efficient adaptation of agile filter(s) that mitigate receiver overload conditions while preserving battery lifetime and achieving an advantageous complexity-utility trade-off. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., collected historical CSI data and filter selection data.

In particular, to determine a filter configuration based at least in part on a utility analysis, intelligent component 625 can employ one of numerous methodologies for learning from data and then drawing inferences from models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. It is to be noted that additional algorithm(s) can be utilized, such as Monte Carlo simulations, or game theoretic models (game trees, game matrices, pure and mixed strategies, utility algorithms, Nash equilibria, evolutionary game theory, etc.).

Components, selectors, and node(s) within provisioning component 235 can exchange information, e.g., data or signaling, through a bus 637, which can be embodied in at least one of a memory bus, a system bus, an address bus, or one or more reference link(s) or interface(s). In an aspect, bus 637 can complement or supplement connectivity of bus 293, which functionally connects processor(s) 275 and memory 285 with provisioning component 235.

Figure 7:
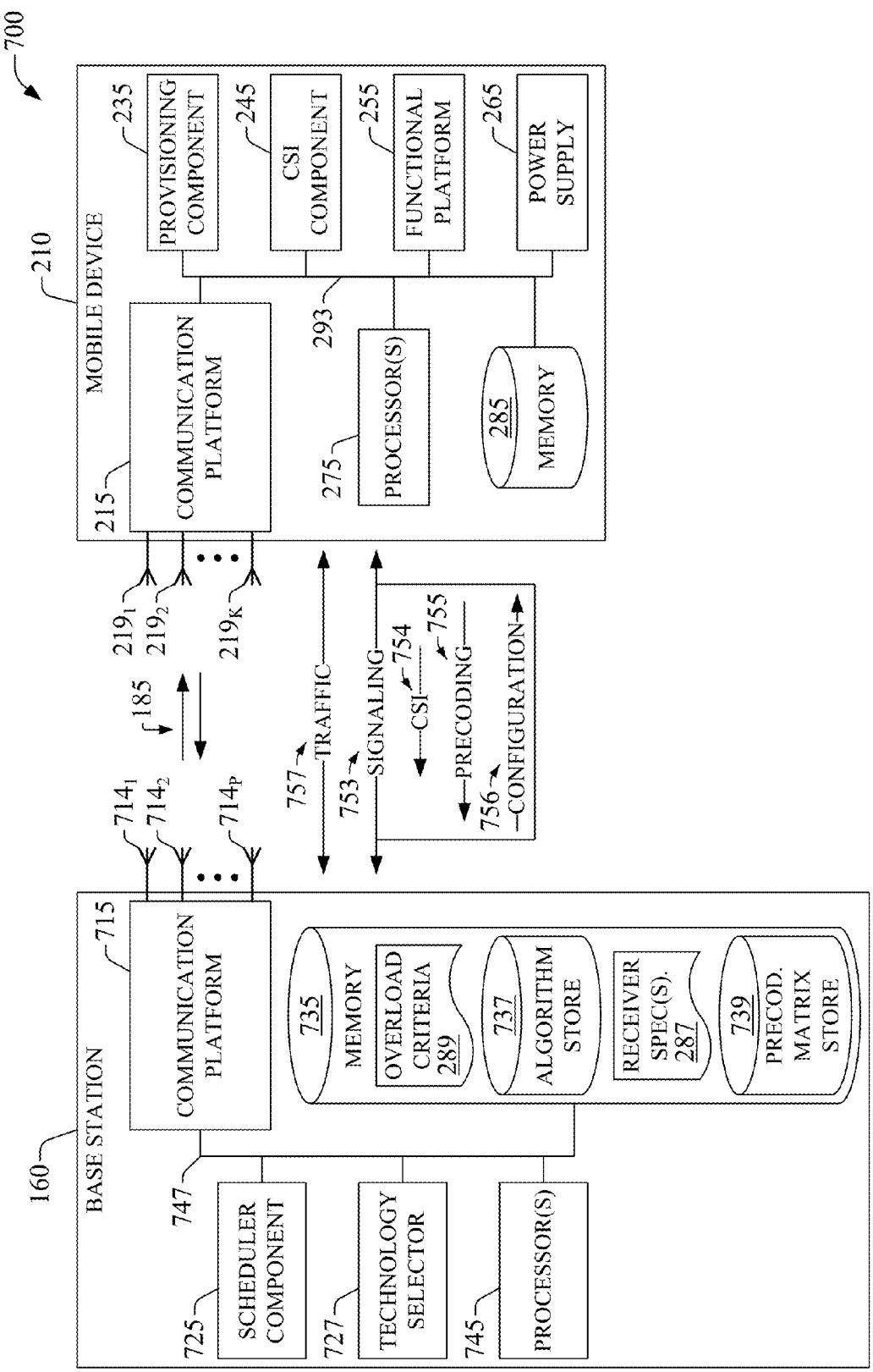
FIG. 7 displays a block diagram of an example system for wireless communication that exploits asymmetric receiver(s) configured in accordance with aspects described herein.

FIG. 7 displays a block diagram of an example system for wireless communication that exploits asymmetric receivers configured in accordance with aspects described herein. Base station 160 includes a communication platform 715, which operates in substantially the same manner as communication platform 215. However, a set of one or more receivers within communication platform 715 can exhibit higher architectural or functional complexity, with ensuing improved performance, than that of receivers $217_\lambda$. As an example, communication platform 715 can include supercooled, high Q and rapid roll-off filters as part of one or more receivers within communication platform 715. It is noted that the one or more high-performance filters that can be provisioned as part of communication platform 715 are relatively large and typically inadequate for installation and utilization in mobile devices or pseudo-stationary devices that can effect wireless communication.

As described above, communication platform 715 can deliver traffic 757, e.g., voice or data, and signaling 753 through a set of one or more antennas $714_1$-$714_P$, with P a positive integer, via over-the-air (OTA) interface or wireless link 185. Traffic 757 can be packet-switched for 2.5G and more recently developed technologies such as 3GPP LTE, or circuit-switched for legacy radio technologies. Signaling 753 can include control information that manages, at least in part, operation and associated telecommunication features of mobile device 210. In particular, signaling 753 can include CSI 754 and precoding coefficients or precoding matrix(ces), indicated as precoding 755. Scheduler component 725 can generate at least part of signaling 753, which can include provisioning data for hardware, firmware, or software, or a combination thereof, that can operate within mobile device 210; allocation of radio resources, e.g., number of PRBs and carrier frequencies that compose the PRBs in 3GPP LTE radio technology; selection of format(s) of data packet(s) and management packet(s) for traffic and signaling exchange, the format(s) consistent with allocated radio resources; semi-persistent scheduling parameters, configuration of telecommunication modes such as MIMO, multiple-input single-output (MISO), single-input multiple output (SIMO), or single-input single-output (SISO); configuration of asymmetric multicarrier mode of operation and associated carriers or sub-bands to implement such mode of operation; indication to operate in a specific radio technology, and modulation formats and coding schemes compatible therewith; indication of allowed transmission power; indication of antenna configuration; or the like. Telecommunication configuration signaling 756, also termed configuration 756, can convey at least a portion of the signaling 753 generated by scheduler component 725.

Scheduler component 725 can generate configuration 756 in accordance at least in part with at least one of CSI of wireless link(s) 185, precoding 755, or receiver capabilities of mobile device 210 as dictated by receiver specification(s) retained in memory element 287. When precoding 755 conveys precoding coefficient(s), scheduler component 725 can select one or more precoding matrices associated with the received precoding coefficients and retained in precoding matrix store 739. Precoding 755 also can convey rank indicator(s), determined as described supra. In an aspect, at least a portion of CSI can be received at communication platform 715 via CSI signaling 754, which can include one or more CQI report(s) and be transported as part of a control channel or management packet(s); communication platform 715 can relay CSI signaling 654 to scheduler component 625. For specific CSI, scheduler component 725 can access overload criteria 289 to assess overload condition or level; assessment can be enabled through a set of one or more CSI thresholds. In an aspect, based at least in part on CSI or receiver capabilities, scheduler component 725 can provision two or more receiver in an asymmetric configuration, e.g., configuration 400 or 450; allocate radio resources, e.g., EM radiation frequencies; adjust MIMO or MISO paths through at least one of selection of disparate modulation and coding schemes; change transmission power assigned to one or more of antennas $714_1$-$714_p$, with P a positive integer; or select an EM radiation pattern emission of a plurality of antennas $714_1$-$714_p$ to control beamforming, or directionality of emitted EM radiation. Accordingly, base station 160 can adapt, or adjust, its operation in response to mobile device 210 radio link condition(s).

Channel state information can be received from mobile device 210. As described above, CSI can include channel quality indicators (CQIs) for each DL path that is statistically independent within the set of P×K DL paths that form DL radio channel within wireless link(s) 185. In addition, CSI for UL path(s) can be generated by base station 160. To generate CSI, scheduler component 725 can instruct mobile device 210 to deliver a sounding signal, e.g., a pilot sequence; and a CSI component (not shown) in base station 160 can process the sounding signal, received via communication platform 715, to produce a set of one or more CQIs for UL path(s). Transmit or receive path CSI can be at least one of antenna specific or frequency specific.

To implement a scheduled telecommunication radio technology, base station 160 includes a technology selector 727 that can configure communication platform 715 to operate in the scheduled radio technology. Configuration can include delivery of signaling to initiate and utilize specific chipset(s) that enable signal generation and processing in communication platform 715 in accordance with communication protocols, which can be retained in memory 735 as part of algorithm store 737, associated with the scheduled radio technology.

In addition to overload criteria 262, algorithm store 737 and receiver specification(s) 287, memory 735 can retain data structures (e.g., metadata, object, classes); code structure(s) (e.g., modules, procedures, subroutines) or instructions; or substantially any type of software or firmware that processor(s) 745 can execute to provide functionality associated with substantially any component(s), platform(s), interface(s), or the like, within base station 160 in accordance with aspects of the subject application. Memory 735 also can retain network information (not shown) such as communication protocols or specifications for various radio technologies; pre-coding codebook(s); code sequences for scrambling, spreading, or blind decoding hypothesis; semi-persistent scheduling parameters; pilot signal(s) such as DL reference signal(s) or UL sounding signals; frequency offsets; macrocell identities (IDs), e.g., cell global identities (CGIs), and so forth.

Processor(s) 745 is configured to confer, and that confer, at least in part, functionality to substantially any or any functional element(s) such as filter(s), amplifier(s), component(s), platform(s), interface(s), or the like, within base station 710 in accordance with one or more aspects of the subject application. Additionally, or alternatively, processor(s) 745 can execute one or more of the functional element(s) contained in base station 710. In example embodiment 700, processor(s) 745 is external to the various functional elements of base station 710; however, processor(s) 745 can be distributed amongst such various functional elements. Processor(s) 745 is functionally connected to each functional element and to memory 735 through bus 747, which can be embodied in at least one of a memory bus, a system bus, an address bus, or one or more reference link(s) or interface(s). To confer the described functionality to the one or more functional elements within base station 710, or operate such functional elements, processor(s) 745 can store information in and retrieve information from memory 735. Such information can include at least one of code instructions; code structure(s); program modules or subroutines; data structures such as classes or configuration files; or the like.

Figure 8:
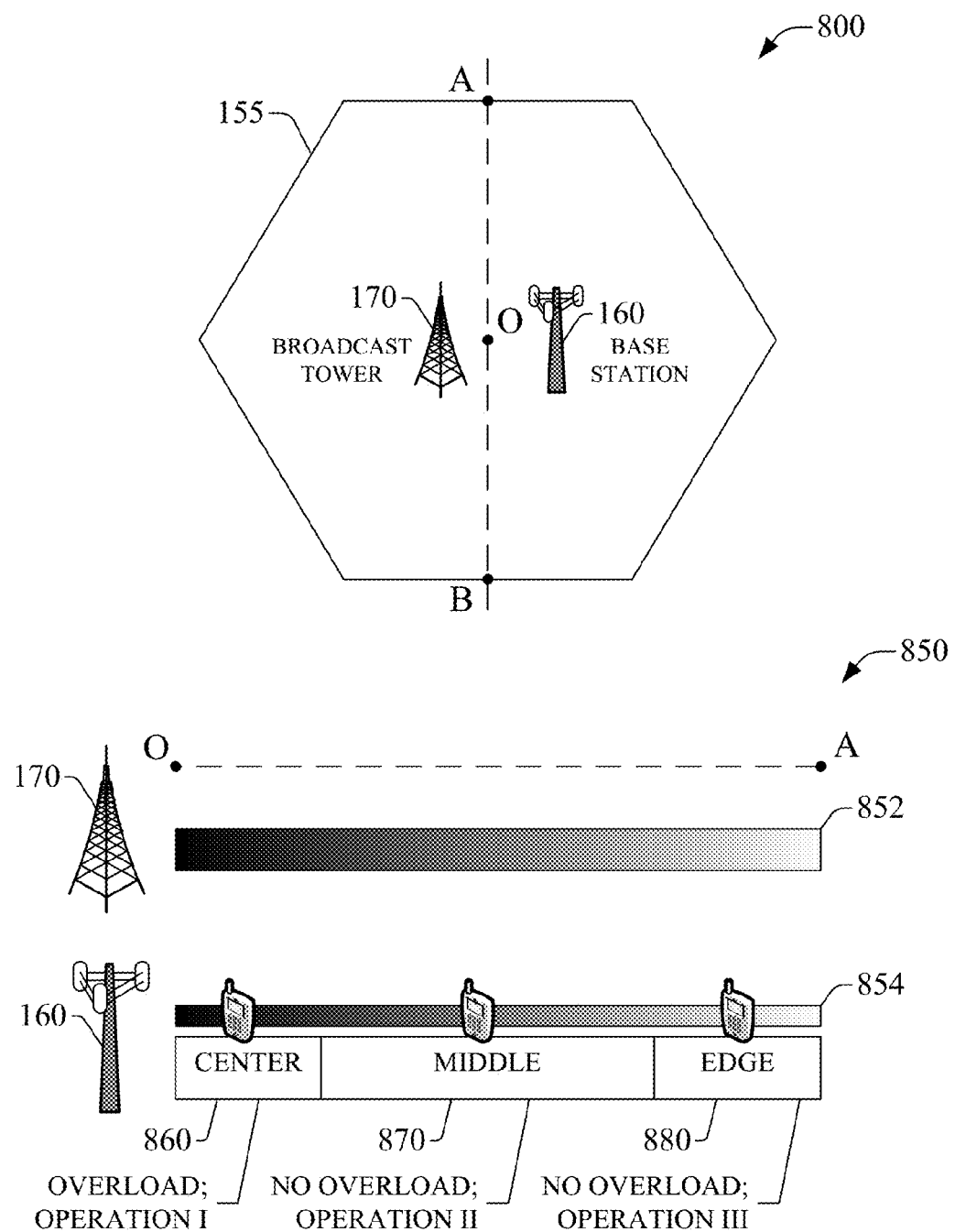
FIG. 8 illustrates a center-cell overload scenario and related telecommunication mode(s) of user equipment in accordance with aspects described herein.

FIG. 8 illustrates a center-cell overload scenario and related telecommunication mode(s) of user equipment in accordance with aspects described herein. In example diagram 800, base station 160 and broadcast tower 170 reside at center of coverage cell 155. Base station 160 delivers data or control through bands $A_{DL}$ 115, $B_{DL}$ 119 and $C_{DL}$ 123, while broadcast tower 170 transmits signal in bands D 131 and E 141. Power of wireless signal transmitted from base station 160 or broadcast tower 170 decrease with increasing distance from cell center O towards cell-boundary location A. Shaded panels 852 and 854 represent such decrement for transmit tower 170 and base station 160, respectively, in the same manner as described above. Cell-center 860, middle-cell 870, and cell-edge 880 regions can be defined as described above.

As described above, to efficiently utilize allowed or licensed EM radiation spectrum, e.g., available block $A_{DL}$ 115, base station 160 can allocate primarily frequency resources in band α 146. However, one or more receivers in UE 180 that tune, at least in part, sub-band $A_{DL}$ 115 can be overloaded when operating in cell center 860 because of close proximity to broadcast tower 170, which transmits at elevated power in band E 141 spectrally adjacent to $A_{DL}$ 115. As indicated supra, when overload occurs, channel quality deteriorates for DL, or receive, path(s) in band α 146. In such scenario, base station 160, via scheduler component 725, for example, can adjust MIMO weighting so as to reduce utilization of block $A_{DL}$ 115 frequency resource and increase utilization of resources in sub-bands $B_{DL}$ 119 and $C_{DL}$ 123. In an asymmetric dual-receiver configuration in which each receiver can tune frequencies in sub-bands $B_{DL}$ 119 and $C_{DL}$ 123, for example, configuration 400, DL path(s) that include frequencies in such sub-bands can be received by both receivers. Further, in severe overload conditions, UE 180 can operate as a single receiver device, without reception on band α 146. Such operation mode can be configured by UE 180 through one or more components therein, e.g., provisioning component 235, or base station 160.

In cell-center overload condition, UE 180 can be configured in operation mode I, also referred to as operation I, which can include at least one of the following: (i) MISO operation with a single receiver tuned to band β 144. Two or more DL data streams are delivered through respective transmit paths toward the single receiver in UE 180. In an aspect, redundant data can be delivered from the multiple transmit paths to the single receive path. In another aspect, data or control can be divided among the multiple DL paths. In MISO mode, scheduler component 725 can exploit suitable interleaving and coding schemes to achieve communication gains, such as array diversity gains, over SISO operation mode. (ii) Asymmetric multicarrier spreading with incorporation of one or more disparate bands unaffected by high power broadcast signal; e.g., bands that are spectrally separated from D 131 and E 141. Such operation can be effected when UE 180 includes one or more receivers that can tune the one or more disparate bands; as an example, provisioning component 235 can activate the one or more receivers that enable asymmetric multicarrier spreading. The one or more receivers can collect at least a portion of DL transmissions, e.g., traffic or signaling, delivered to UE 180. As an example, when UE 180 can tune AWS band(s), via the one or more activated receivers, base station 160 can schedule DL communication through band β 144 and AWS DL path(s). (iii) DL and UL telecommunication handoff to paired bands that are unaffected by high-power broadcast communication.

In non-overload conditions in middle-cell 870, telecommunication can proceed in operation mode II, which includes at least one of the following: (a) MIMO spatial multiplexing utilizing frequency resources in band β 144. (b) Asymmetric multicarrier telecommunication with band α 146 and band β 146 augmented by one or more disparate paired or unpaired sub-band(s) unaffected by overload caused by high-power broadcast; for instance, augmentation can include $V_{DL}$ 476 or $T_{DL}$ 478, which can be embodied in AWS sub-band(s). Such multicarrier operation mode can be implemented when UE 180 includes receivers that can tune the disparate paired band. (c) DL and UL telecommunication handoff to disparate paired bands with implementation of operation in MIMO spatial multiplexing through radio resources in the disparate paired bands. As an example, the disparate paired bands can consist of a band that includes $S_{DL}$ 436 and $T_{DL}$ 438, and a band that includes frequency block $T_{DL}$ 438. As indicated above, such handoff can be effected, at least in part, via provisioning component 235, based at least in part on at least one of signaling, e.g., 753, received from a base station, or autonomous determination by a mobile device that includes provisioning component 235. In addition, to implement mode of operation (c), the mobile device has to include suitable receivers with respective filters therein.

In non-overload condition in cell edge 880, telecommunication is effected in operation mode III, which includes MIMO transmit diversity telecommunication with SFBC that exploits PRBs consisting of sub-carriers in band α 146 (e.g., blocks $A_{DL}$ 115, $B_{DL}$ 119, and $C_{DL}$ 123) and band β 144 (e.g., $B_{DL}$ 119 and $C_{DL}$ 123). Such MIMO telecommunication can exploit two or more transmit path(s) when base station 160 includes more than two antennas (e.g., P>2), and the two receive paths associated with band α 146 and band β 146.

Figure 9:
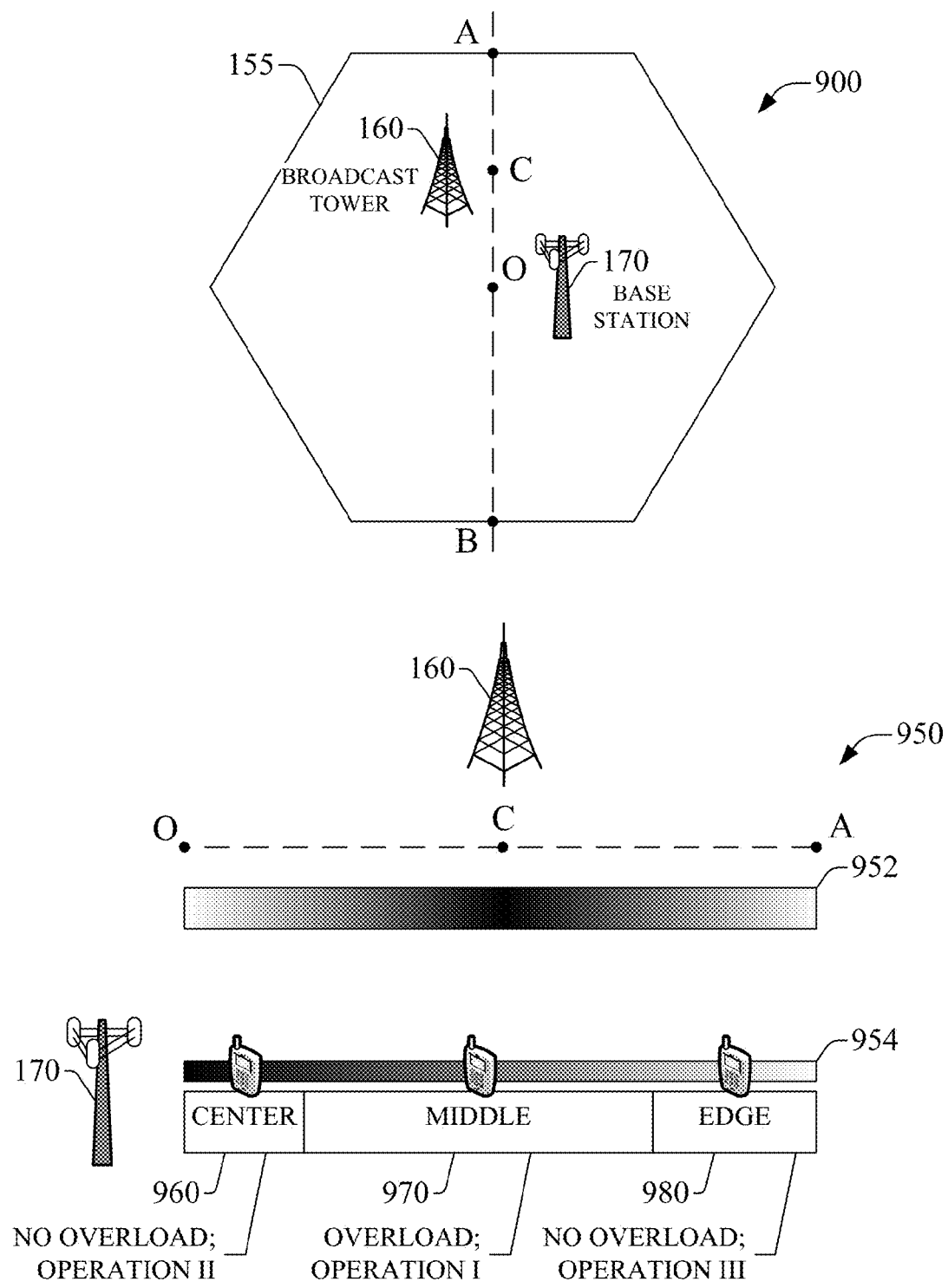
FIG. 9 illustrates an example middle-cell overload scenario and related telecommunication mode(s) of user equipment in accordance with aspects described herein.

FIG. 9 illustrates an example middle-cell overload scenario and related telecommunication mode(s) of user equipment in accordance with aspects described herein. In example diagram 900, base station 160 and broadcast tower 170 reside, respectively, at center and a middle cell location of coverage cell 155. Base station 160 delivers data or control through sub-bands $A_{DL}$ 115, $B_{DL}$ 119 and $C_{DL}$ 123, while broadcast tower 170 transmits signal in bands D 131 and E 141. Power of wireless signal transmitted from base station 160 or broadcast tower 170 decrease with increasing. Shaded panels 952 and 954 in diagram 950 represent the decreasing power of propagated wireless signal with increasing distance from broadcasting tower 170 and base station 160, respectively, in the same manner as described above. Cell-center, middle-cell, and cell-edge regions also can be defined as described above.

In view of the illustrated deployment of broadcast transmit tower 170, user equipment 180 is likely to operate in overload condition within middle cell region 970. In such scenario, UE 180 communication is operation mode I described supra. In non-overload conditions in cell center 960 and cell edge 980, UE 180 communicates, respectively, in operation mode II and operation mode III as previously described.

Figure 10:
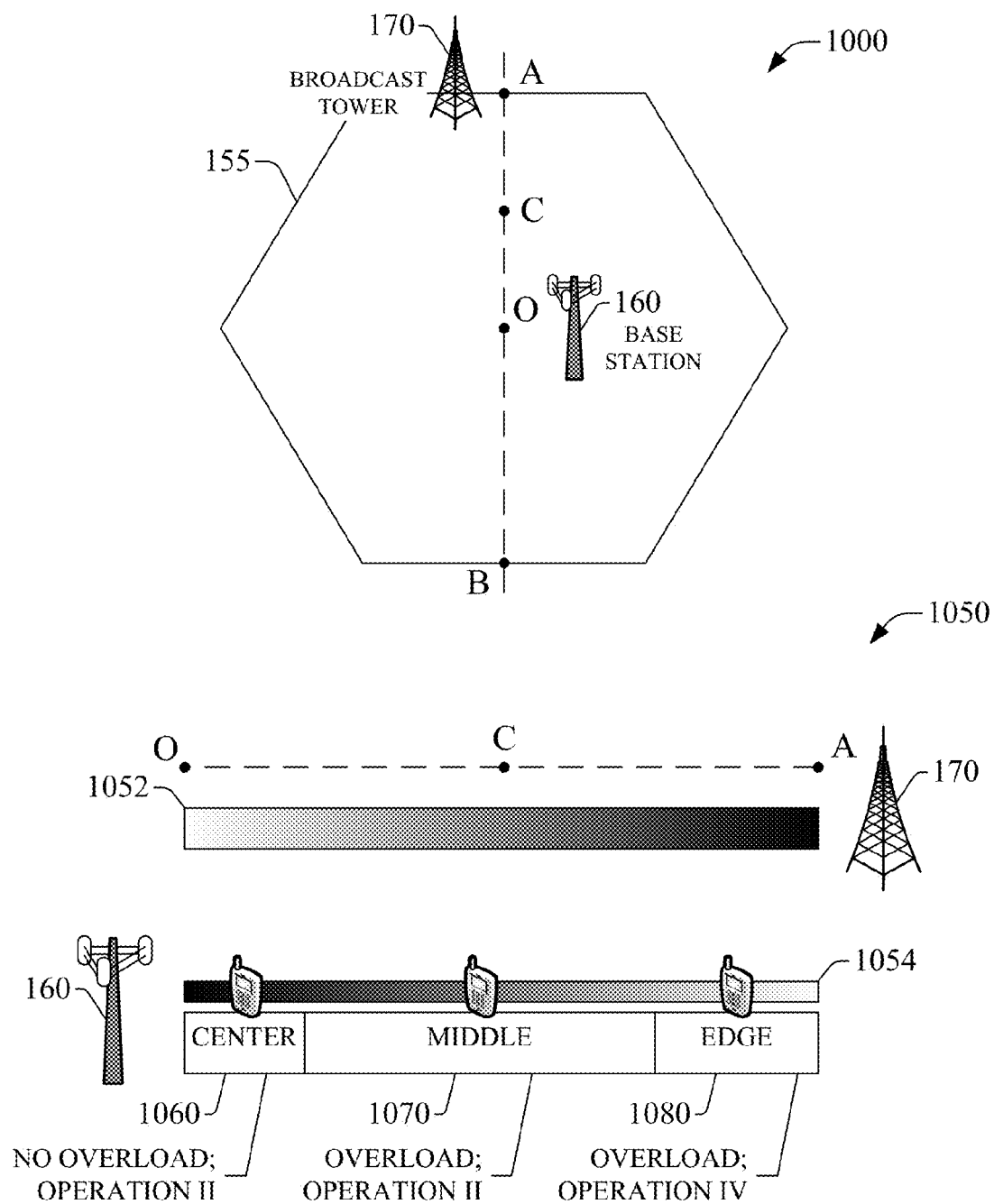
FIG. 10 illustrates an example cell-edge overload scenario and related telecommunication mode(s) of user equipment in accordance with aspects of the subject application.

FIG. 10 illustrates an example cell-edge overload scenario and related telecommunication mode(s) of user equipment in accordance with aspects described herein. In example diagram 1000, base station 160 and broadcast tower 170 reside, respectively, at center and a cell edge location of coverage cell 155. Base station 160 delivers data or control through sub-bands $A_{DL}$ 115, $B_{DL}$ 119 and $C_{DL}$ 123, while broadcast tower 170 transmits signal in bands D 131 and E 141. Power of wireless signal transmitted from base station 160 or broadcast tower 170 decreases with increasing distance from the base station 160 or the broadcast tower 170. Shaded panels 1052 and 1054 in diagram 1050 represent the decreasing power of propagated wireless signal with increasing distance from broadcasting tower 170 and base station 160, respectively, in the same manner as described above. Cell-center, middle-cell, and cell-edge regions also can be defined as described above.

In view of the illustrated deployment of broadcast transmit tower 170 at cell edge location A, user equipment 180 is likely to operate in overload condition when in proximity to location A, e.g., cell edge 1080. In such scenario, UE 180 communication is operation mode IV, which includes at least one of (1) one or more of features (i), (ii), or (iii) of operation mode I described above, or (2) DL power boosted asymmetrical multicarrier spreading described below. In non-overload conditions in cell center 1060 and middle cell 1070, UE 180 communicates, respectively, in operation mode II and operation mode III as previously described.

Feature (2) in operation mode IV can be employed in cases UE 180 is particularly prone to overload from a sub-band utilized for broadcasting wireless signal linked to a specific wireless service. Downlink power boost includes establishment of a high-power DL carrier within a band, e.g., AWS band, that is unaffected by broadcasted wireless signal in order to compensate for region of spectrum not employed due to overload conditions. In such case, an UL band paired to the band that includes a sub-band spectrally adjacent to a sub-band allowed for broadcast, can be configured for anchor carrier and control data such as signaling 753. The UL band can be the frequency band consisting of $A_{UL}$ 105, $B_{UL}$ 109 and $C_{UL}$ 113. For DL communication, the established high-power downlink carrier, e.g., an AWS DL carrier, can be exploited to deliver substantially all or all downlink user data. It is noted that the UL band, e.g., frequency band consisting of $A_{UL}$ 105, $B_{UL}$ 109, and $C_{UL}$ 113, which can be embodied in the lower 700 MHz paired uplink band, can offset the path imbalance, e.g., stronger DL than UL, originated from the configuration and utilization of the high-power DL carrier.

In view of the example systems described above, example methods that can be implemented in accordance with the disclosed subject matter can be better appreciated with reference to flowcharts in FIGS. 11-17. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein can alternatively be represented as a series of interrelated states or events, such as in a state diagram. Moreover, interaction diagram(s) or call flow(s) can represent example methods in accordance with the disclosed subject matter when disparate entities enact disparate portions of the example methods. Furthermore, not all illustrated acts may be required to implement a method in accordance with the subject specification. Further yet, two or more of the disclosed example methods can be implemented in combination with each other, to accomplish one or more features or advantages herein described. It should be further appreciated that the example methods disclosed throughout the subject specification can be stored on an article of manufacture, or computer-readable medium, to facilitate transporting and transferring such methods to computers for execution, and thus implementation, by a processor or for storage in a memory.

Figure 11:
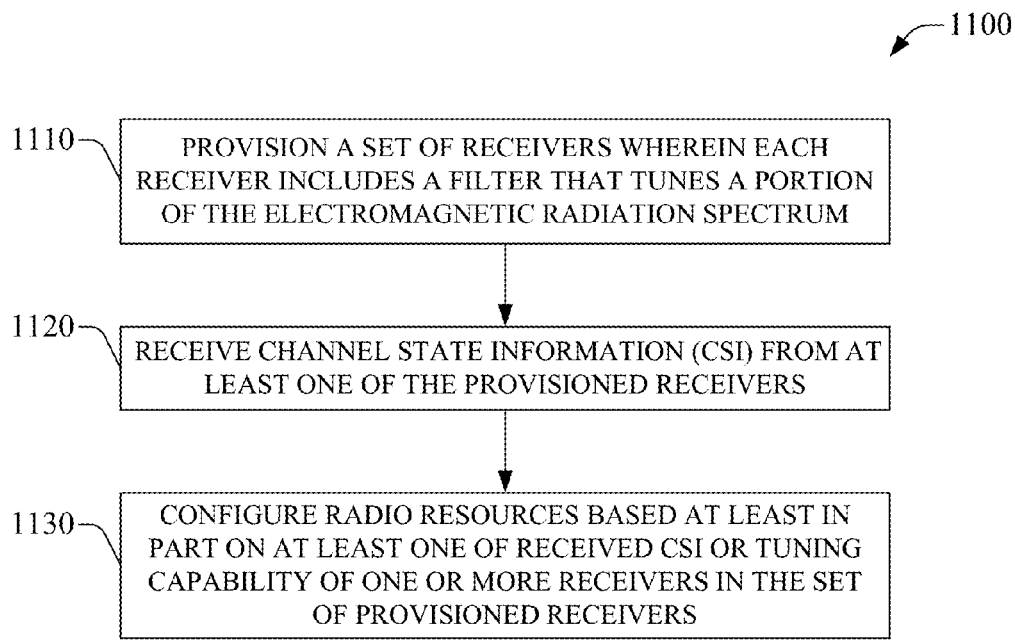
FIG. 11 presents a flowchart of an example method for operating a mobile device with one or more receivers in accordance with aspects described herein.

FIG. 11 presents a flowchart of an example method 1100 for operating a mobile device with one or more receivers in accordance with aspects described herein. A base station or a network management component, such as a radio network controller, can enact the subject example method. In an aspect, one or more processors (e.g., processor(s) 745) functionally coupled to the base station or the network management component, and that execute code instructions retained in memory to provide functionality to the base station or the network management component, can enact this example method 1100 through execution of at least such instructions. At act 1110, a set of receivers is provisioned. Each receiver includes a filter that tunes a portion of the electromagnetic (EM) radiation spectrum. The filter can be one of a static band-pass filter or an agile band-pass filter. Agile filters can adjust the band-pass spectral response based at least in part on at least one of external operational condition(s) or an applied external control field or parameter. At act 1120, channel state information (CSI) is received from at least one of the provisioned receivers. Channel state information can include radio link quality metrics such as one or more of received signal strength indicators (RSSIs), received signal code power (RSCP), carrier-over-interference (C/I), carrier-over-noise (C/N), signal-to-noise ratio (SNR), signal-to-noise-and-interference ratio (SNIR), or energy per chip over total received power ($E_c/N_0$). CSI also includes an estimation of one or more channel gain matrix elements $h_{\mu\nu}$, as described supra. At act 1130, radio resources are configured based at least in part on at least one of received CSI or tuning capability of one or more receivers in the set of provisioned receivers. Thus, in addition or as an alternative to architectural constraints, telecommunication is scheduled or adjusted in a closed-loop scheme with CSI feedback at the base station or the one or more network management component that enact the subject example method. Received CSI can enable determination of overload operational condition(s) at the source of the received CSI. Configuration of radio resources in overload conditions can include at least one of (i) selection or generation of precoding coefficients for MIMO weighting; (ii) scheduling of MIMO spatial multiplexing or MIMO transmit diversity mode of operation; and (iii) allocation of physical resource blocks based at least in part on sub-carriers in a telecommunication band spectrally shifted with respect to a band that causes at least part of the overloaded operation.

Figure 12:
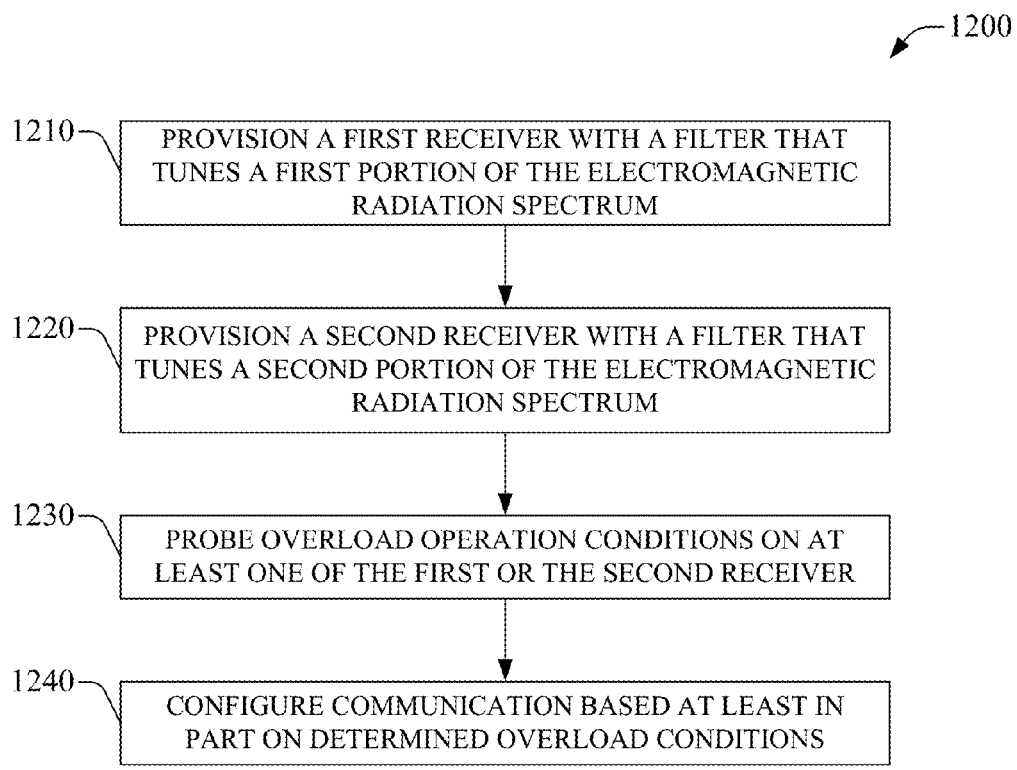
FIG. 12 is a flowchart of an example method for operating user equipment with at least two receivers in accordance with aspects described herein.

FIG. 12 is a flowchart of an example method 1200 for operating user equipment with at least two receivers in accordance with aspects described herein. A base station or a network management component, such as a radio network controller, can enact the subject example method. In an aspect, one or more processors (e.g., processor(s) 645) functionally coupled to the base station or the network management component, and that execute code instructions retained in memory to provide functionality to the base station or the network management component, can enact this example method 1200 through execution of at least such instructions. At act 1210, a first receiver is provisioned, the first receiver includes a filter that tunes a first portion of the EM radiation spectrum. At act 1220, a second receiver is provisioned, the second receiver comprises a filter that tunes a second portion of the EM radiation spectrum. At 1230, overload operation conditions are probed on at least one of the first or second receiver. In an aspect overload conditions can be probed through analysis of DL CQI reports received from a mobile device, or through assessment of a rank estimator as described above. At act 1240, communication is configured based at least in part on at least one of determined overload operation conditions, or available receiver specification(s) for a served mobile device.

Figure 13:
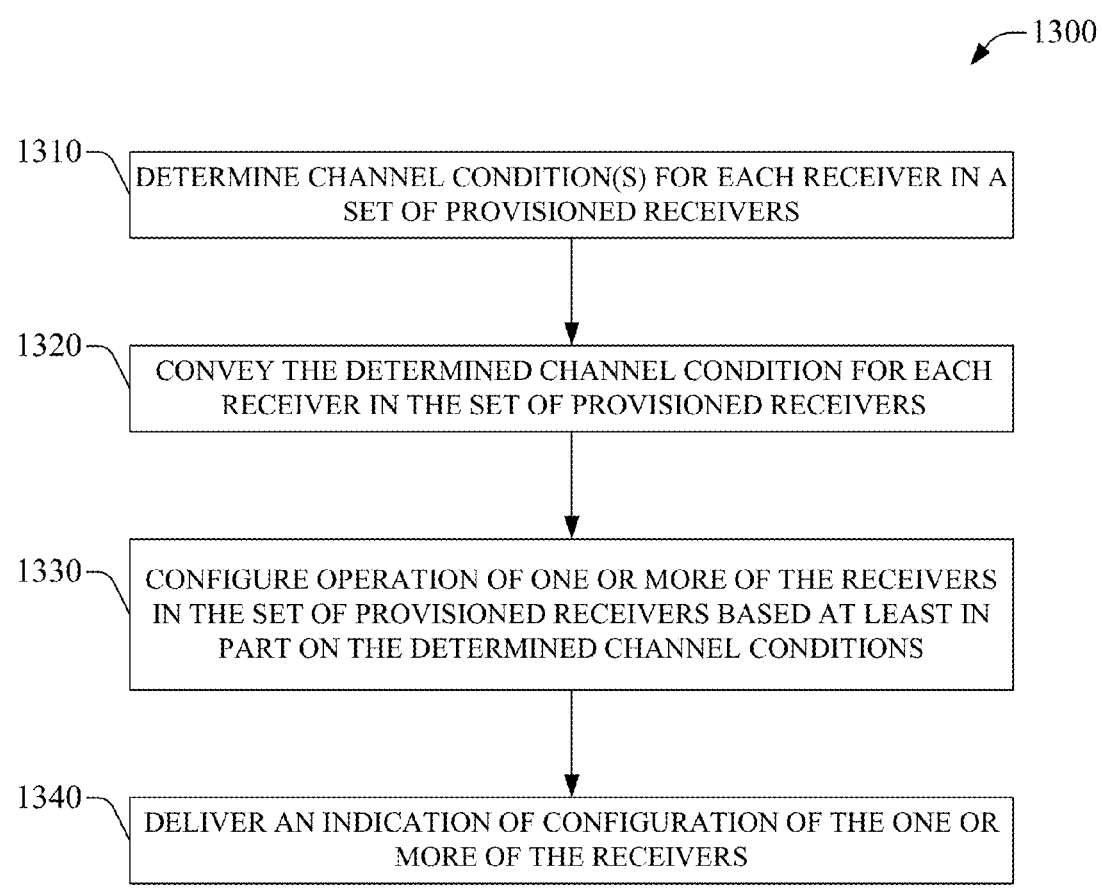
FIG. 13 is a flowchart of an example method for configuring operation of a set of receivers according to aspects described herein.

FIG. 13 is a flowchart of an example method 1300 for configuring operation of a set of receivers according to aspects described herein. A device, mobile or otherwise, with wireless capability can affect the subject example method. In an aspect, one or more processors (e.g., processor(s) 275) functionally coupled to the device, and that executes code instructions retained in memory to provide functionality to the device, can implement this example method 1300 through execution of at least such instructions. At act 1310, channel condition(s) are determined for each receiver in a set of one or more provisioned receivers. A component, e.g., CSI component 245, within the device that enacts the subject example method can determine the channel condition(s), or radio link quality, as described herein. At act 1320, the determined channel condition(s) for each receiver in the set of provisioned receivers are conveyed. Generally, the channel condition(s) are delivered to a based station that serves the device that implements the subject example method or belongs to an active set of base stations associated with the device. At act 1330, operation of one or more of the receivers in the set of provisioned receivers is configured based at least in part on the determined channel condition(s). In a scenario, two receivers can be provisioned in an asymmetric configuration, e.g., 400, and utilized as a MIMO pair for spatial multiplexing or transmit diversity telecommunication. At act 1340, an indication of configuration of the one or more of the receivers is delivered. An indication can be at least one of an Unstructured Supplementary Service Data (USSD) code, a SMS message, a reserved bit within a management, or control, frame or protocol data unit header, a multi-bit word conveyed in an uplink control channel, or the like.

Figure 14:
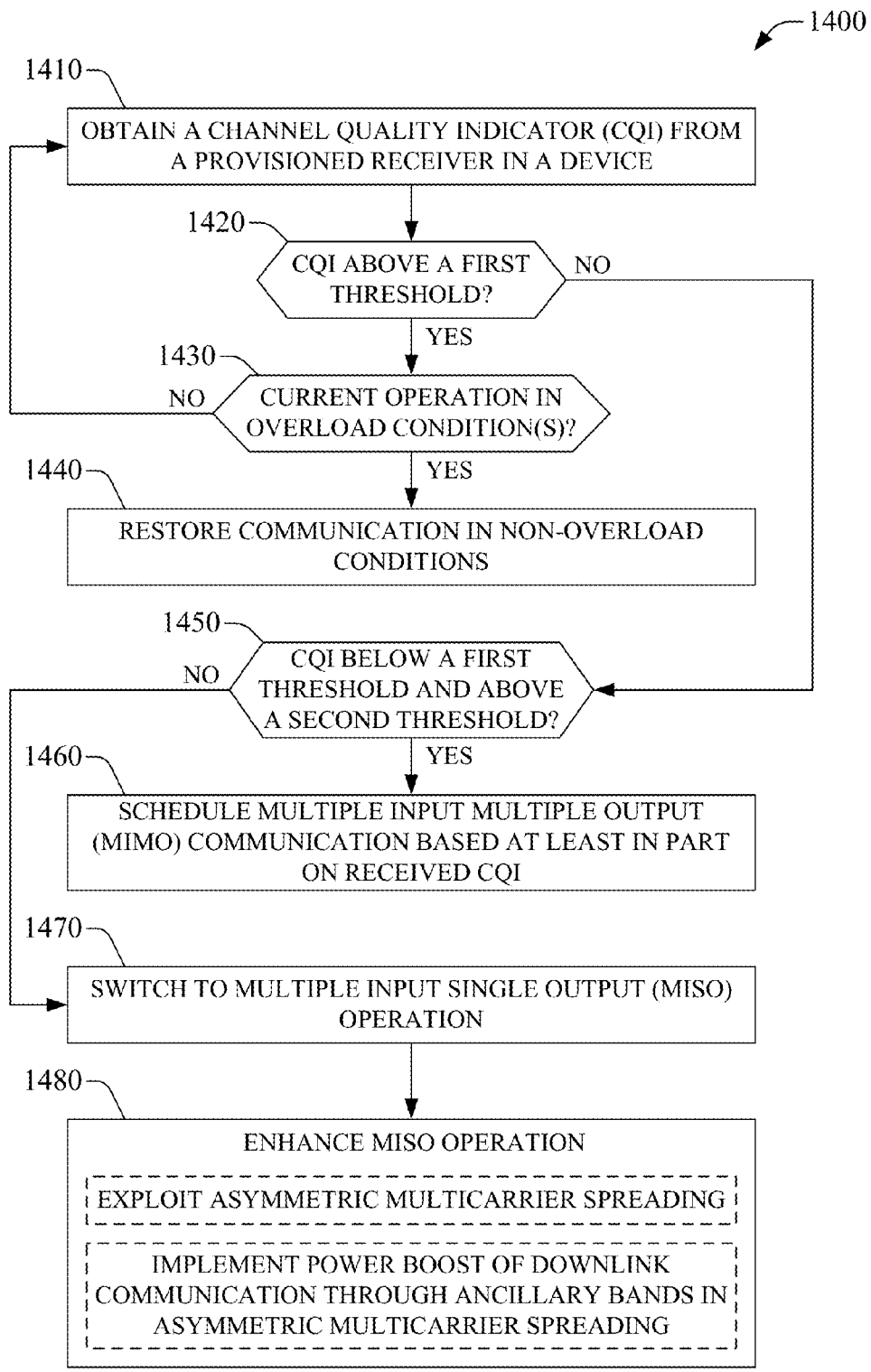
FIG. 14 is a flowchart of an example method for establishing a communication mode based at least in part on overload condition(s) of operation according to aspects of the subject application.

FIG. 14 is a flowchart of an example method 1400 for establishing a telecommunication mode based at least in part on overload condition(s) of operation according to aspects of the subject application. A base station or a network management component, such as a radio network controller, can enact the subject example method. In an aspect, one or more processors (e.g., processor(s) 745) functionally coupled to the base station or the network management component, and that execute code instructions retained in memory to provide functionality to the base station or the network management component, can enact this example method 1400 through execution of at least such instructions. At act 1410, a channel quality indicator (CQI) is obtained from a provisioned receiver in a device, which can be mobile or tethered. At act 1420, it is determined if the CQI is above a first threshold. In the affirmative case, flow is directed to act 1430 in which it is probed whether current operation of the device is in overload condition(s). In the affirmative case, communication in non-overloaded condition(s) is restored at act 1440. Conversely, in the negative case, flow is directed to act 1410 and a CQI is received. When outcome of act 1420 is negative, flow is directed to act 1450 in which it is established if CQI is below a first threshold and above a second threshold. Positive outcome leads to act 1460, in which multiple input multiple output (MIMO) communication is scheduled based at least in part on received CQI. Negative outcome of evaluation act 1450 leads to act 1470, in which operation is switched to multiple-input single-output (MISO) operation. At act 1480, MISO operation is enhanced. Enhancement is effected to mitigate performance sub-optimality associated with MISO operation. In an aspect, enhancement can be accomplished, at least in part, through at least on of transmit diversity, wherein a plurality of redundant data streams, e.g., P streams, are transmitted towards the single receiver in the device that operates in MISO mode; utilization of asymmetric multicarrier spreading, as described above; or implementation of power boost of downlink communication through ancillary bands in asymmetric multicarrier spreading.

Figure 15:
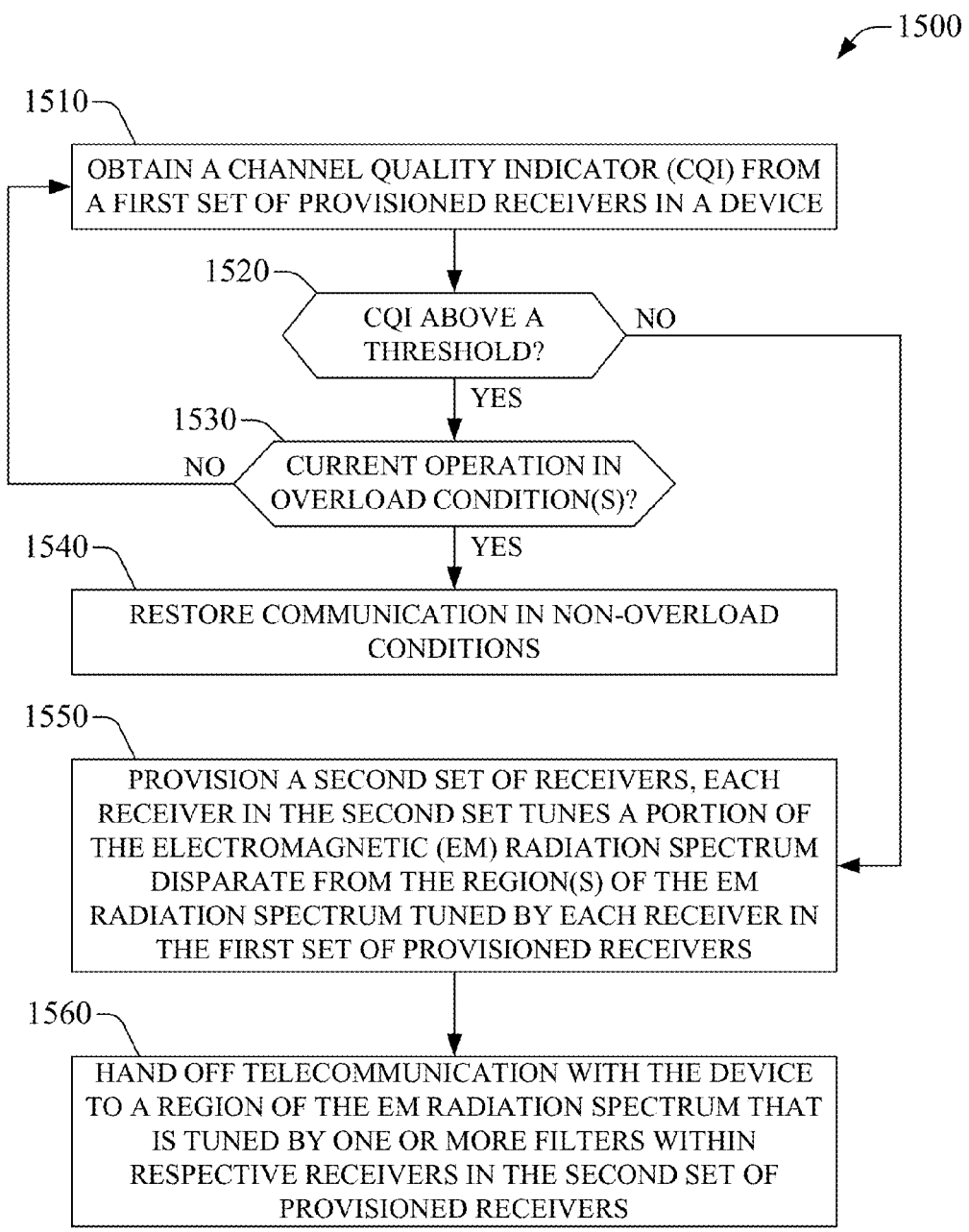
FIG. 15 displays a flowchart of an example method for handing off telecommunication from a first set of frequencies to a second set of frequencies according to features disclosed herein.

FIG. 15 displays a flowchart of an example method for handing off telecommunication from a first region in the EM radiation spectrum to a second region therein according to features disclosed herein. While the subject example method is described in connection with channel quality indicator(s), other channel state information also can be exploited. A base station or a network management component, such as a radio network controller, can enact the subject example method. In an aspect, one or more processors (e.g., processor(s) 745) functionally coupled to the base station or the network management component, and that execute code instructions retained in memory to provide functionality to the base station or the network management component, can enact this example method 1500 through execution of at least such instructions. At act 1510, channel quality indicator (CQI) from a first set of provisioned receivers in a device, mobile or pseudo-stationary. At act 1520, it is determined if the obtained CQI is below a threshold, which can embody a criterion to discriminate amongst overloaded and non-overloaded operation of the device. In the affirmative case, flow is directed to act 1530 in which it is determined whether current operation of the device is in overload condition(s); overload operation can be indicated by an alphanumeric or logic variable retained in memory, e.g., in a configuration file that is part of configuration record(s) 291. In the affirmative case, communication in non-overloaded condition(s) is restored at act 1540. Conversely, in the negative case, flow is directed to act 1510. When outcome of act 1520 is negative, the device operates in overload and flow is directed to act 1550 in which a second set of receivers in the device is provisioned, wherein each receiver in such second set tunes a portion of the EM radiation spectrum that is different from the region(s) of the EM radiation spectrum tuned by each receiver in the first set of provisioned receivers. At act 1560, telecommunication with the device is handed off to an EM radiation spectrum region that is tuned by one or more filters within respective receivers in the second set of provisioned receivers. Telecommunication can include DL and UL transmission of data or signaling. Handover to the disparate spectrum region can mitigate overload of the device.

Example method 1500 can be re-enacted to monitor operation conditions of the device when telecommunication is effected at least in part through the second set of provisioned receivers and associated filters. In such a case, the second set of provisioned receivers is adopted as the first set of provisioned receivers.

Figure 16:
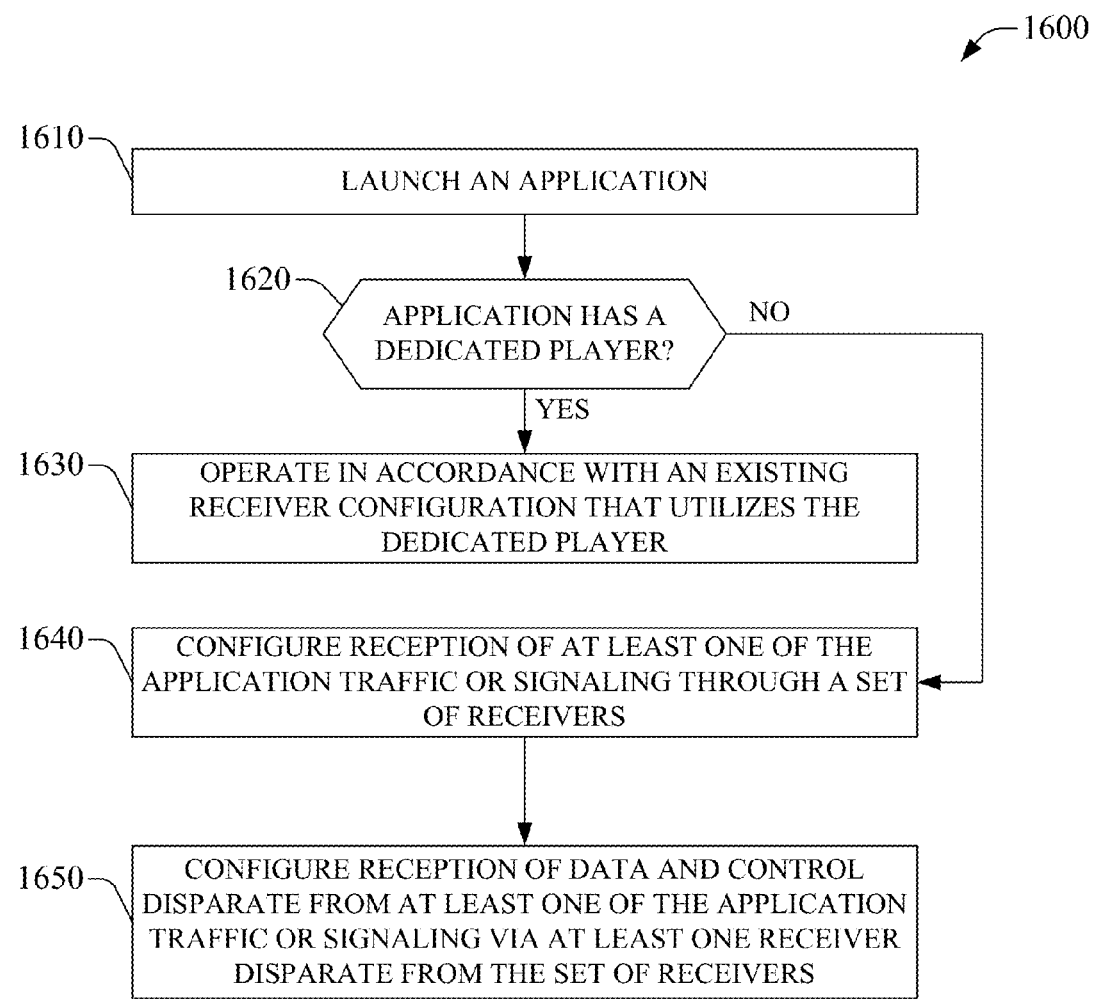
FIG. 16 presents a flowchart of an example method for employing a dedicated receiver for one or more applications according to aspects described herein.

FIG. 16 presents a flowchart of an example method 1600 for employing a dedicated receiver for one or more applications according to aspects described herein. A device, mobile or otherwise, with wireless capability can affect the subject example method 1600. In an aspect, one or more processors (e.g., processor(s) 275) functionally coupled to the device, and that executes code instructions retained in memory to provide functionality to the device, can implement this example method 1600 through execution at least such code instructions. At act 1610, an application is launched. At act 1620, it is evaluated if the application is associated with a dedicated player. As an example, broadcasted Internet Protocol television can utilize a specific receiver that includes a filter that tunes a portion of the EM radiation spectrum in which the IPTV signal is broadcasted (see, e.g., FIG. 1). The dedicated player can include at least one of one or more processor that execute the launched application, or a set of antennas and receivers, wherein each receiver in the set of receivers includes at least one filter and one amplifier. When the launched application lacks a dedicated player, flow is directed to act 1630, in which the apparatus that launches the application is operated in accordance with an existing receiver configuration. Conversely, positive outcome of act 1620 leads to act 1640, in which at least one of the application traffic or signaling is configured to be received through a set of receivers wherein each receiver can tune a portion of the EM radiation spectrum that is utilized for delivery of the application traffic or signaling (see, e.g., FIG. 4B). The tuned portions of the EM radiation spectrum can be distinct or fully or partially overlapping; see, e.g., FIG. 4B. Configuration can include activation of one or more receivers in the set of receivers, and signaling of such activation. At act 1650, reception of data and control disparate from at least one of the application traffic or signaling is configured to be received via at least one receiver distinct from the set of receivers. One or more receivers in the set of receivers that tune at least one of application traffic or signaling can collect wireless signal(s) in the same spectral region than the at least one receiver distinct from the set of receivers; see, e.g., FIG. 4B. Such configuration can enable communication in MIMO mode of operation when channel quality affords it, as described supra.

Figure 17:
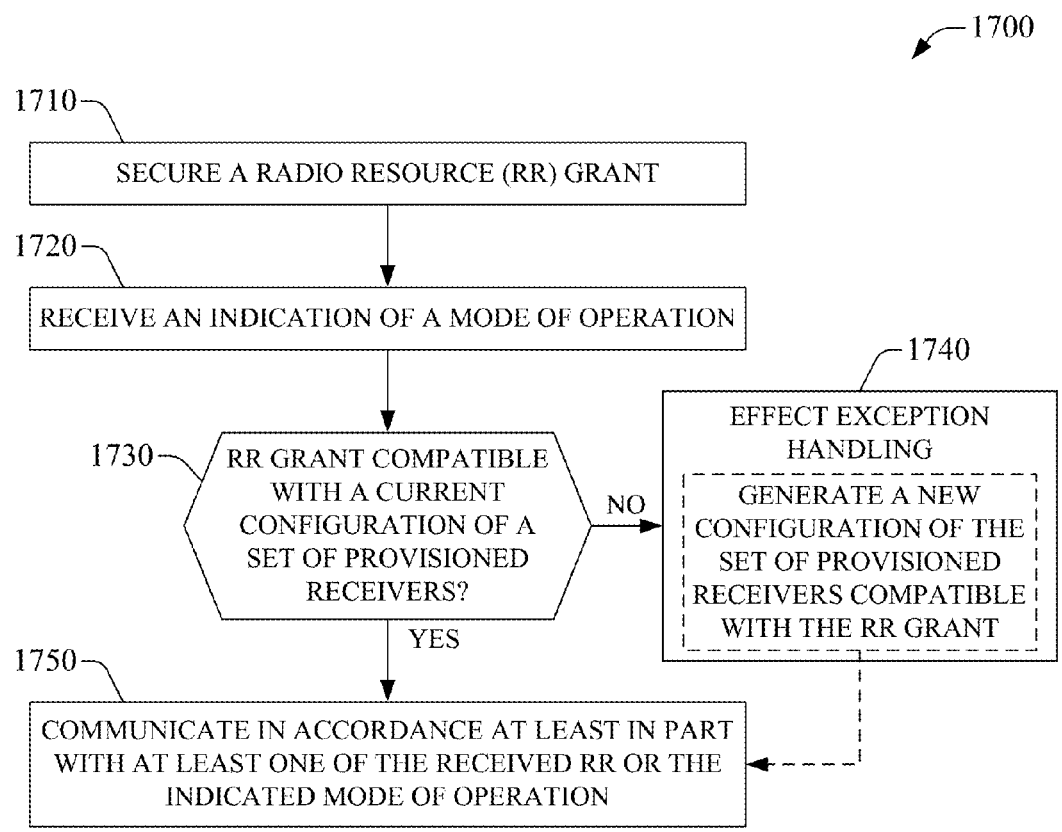
FIG. 17 presents a flowchart of an example method for communicating wirelessly through a set of provisioned receivers according to aspects described herein.

FIG. 17 presents a flowchart of an example method 1700 for communicating wirelessly through a set of provisioned receivers according to aspects described herein. A device, mobile or otherwise, with wireless capability can affect the subject example method 1700. In an aspect, one or more processors (e.g., processor(s) 275) functionally coupled to the device, and that execute code instructions retained in memory to provide functionality to the device, can implement this example method 1700 through execution of at least such code instructions. At act 1710, a radio resource (RR) grant is secured. The radio resource can include specific PRBs composed of selected sub-carrier sets, as described supra. The RR can be granted by a base station that serves the device that enacts the subject method. Allocation of radio resource(s) can be based at least in part on channel state information, as described hereinbefore. At act 1720, an indication of a mode of operation is received. In an aspect, the mode of operation can include at least one of MIMO, MISO, asymmetric-carrier spreading, or the like. The indication can be received via signaling delivered in a control channel or in management packet(s). At act 1730, it is determined if the RR is compatible with a current configuration of a set of provisioned receivers, which can reside within the device, mobile or otherwise, that enacts the subject example method. For instance, a receiver configuration can detect wireless signal(s) in specific frequency blocks that exclude or include PRBs that are part of the RR. A negative determination leads to act 1740, in which exception handling is affected. In an aspect, exception handling can be active and can include generating a new configuration of the set of provisioned receivers, wherein the new configuration is compatible with the RR grant. A provisioning component, e.g., 235, can generate, at least in part, the new configuration. Upon generation of the new configuration, flow can be directed to act 1750. In another aspect, exception handling at act 1740 can be passive and can comprise signaling an indication of the current configuration, and delivering an error message that conveys incompatibility amongst such configuration and the received RR. Conversely, a positive determination at act 1730 results in communication in accordance at least in part with at least one of the received RR or the indicated mode of operation at act 1750.

Figure 18:
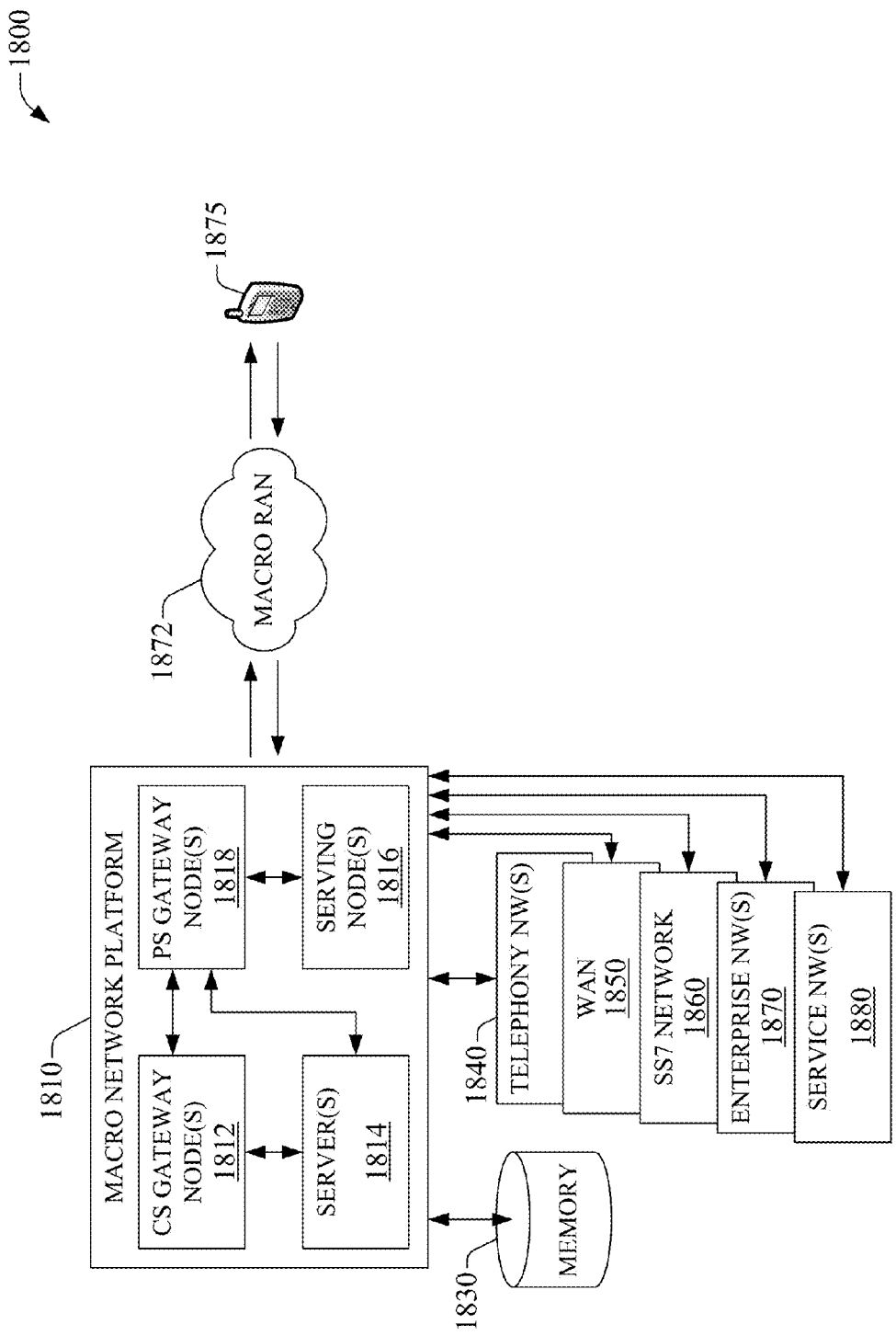
FIG. 18 is an example wireless network environment that can enable or exploit aspects or features of the subject application.

FIG. 18 displays an example wireless communication environment 1800 that can enable, at least in part, various aspects or features of the subject application. A macro network platform 1810 which serves, or enables communication with user equipment 1875 (e.g., mobile device 210) via a macro radio access network (RAN) 1872. It should be appreciated that in cellular wireless technologies (e.g., 3GPP UMTS, HSPA, 3GPP LTE, 3GPP UMTS, 3GPP2 UMB), macro network platform 1810 is embodied in a Core Network. RAN 1872 includes base station(s), or access point(s), and its associated electronic circuitry and deployment site(s), in addition to a wireless radio link operated in accordance with the base station(s). RAN 1872 can adopt disparate embodiments based at least in part on specific radio technology: A 3GPP UMTS RAN can include a set of radio network controllers (RNCs), each functionally connected to a set of one or more base station, with the RNCs mutually functionally connected and functionally connected to macro network platform 1810; while a 3GPP LTE RAN does not include RNCs, with associated functionality effected by deployed Node Bs which are functionally connected to macro network platform 1810.

Generally, macro network platforms 1810 include components, e.g., nodes, gateways, interfaces, servers, or platforms, that enable both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject application, macro network platform 1810 includes CS gateway node(s) 1812 which can interface CS traffic received from legacy networks like telephony network(s) (NW(s)) 1840 (e.g., public switched telephone network (PSTN), or public land mobile network (PLMN)) or a SS7 (signaling system #7) network 1860. Circuit switched gateway 1812 can authorize and authenticate traffic (e.g., voice) arising from such networks. Additionally, CS gateway 1812 can access mobility, or roaming, data generated through SS7 network 1860; for instance, mobility data stored in a visitor location register (VLR), which can reside in memory 1830. Moreover, CS gateway node(s) 1812 interfaces CS-based traffic and signaling and gateway node(s) 1818. As an example, in a 3GPP UMTS network, PS gateway node(s) 1818 can be embodied in gateway GPRS support node(s) (GGSN).

In addition to receiving and processing CS-switched traffic and signaling, PS gateway node(s) 1818 can authorize and authenticate PS-based data sessions with served (e.g., through macro RAN) wireless devices. Data sessions can include traffic exchange with networks external to the macro network platform 1810, such as wide area network(s) (WANs) 1850, enterprise networks 1870 (e.g., enhanced 911), or service NW(s) 1880, which can include IP multimedia subsystem (IMS) deployments. It should be appreciated that local area network(s) (LANs), which may be a part of enterprise NW(s) 1870, also can be interfaced with macro network platform 1810 through PS gateway node(s) 1818. Packet-switched gateway node(s) 1818 generates packet data contexts when a data session is established. To at least that end, in an aspect, PS gateway node(s) 1818 can include a tunnel interface (e.g., tunnel termination gateway (TTG) in 3GPP UMTS network(s); not shown) which can afford packetized communication with disparate wireless network(s), such as Wi-Fi networks. It should be further appreciated that the packetized communication can include multiple data flows that can be generated through server(s) 1814. It is to be noted that in 3GPP UMTS network(s), PS gateway node(s) 1818 (e.g., GGSN) and tunnel interface (e.g., TTG) comprise a packet data gateway (PDG). Communication of information, e.g., data or signaling, amongst macro network platform 1810 and external network(s) 1840-1880 can be effected through reference links, conventional links, or a combination thereof. Features or characteristics of such links dictated primarily by the type of communication-switching, e.g., CS or PS, of the external networks.

Macro network platform 1810 also includes serving node(s) 1816 that convey to RAN 1872, and elements therein, the various packetized flows of information, or data streams, received through PS gateway node(s) 1818. As an example, in a 3GPP UMTS network, serving node(s) 1816 can be embodied in serving GPRS support node(s) (SGSN).

In an aspect, server(s) 1814 in macro network platform 1810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1810. Data streams can be conveyed to PS gateway node(s) 1818 for authorization/authentication and initiation of a data session, and to serving node(s) 1816 for communication thereafter. Server(s) 1814 also can effect security, e.g., implement one or more firewalls; Authorization, Authentication, and Accounting; RADIUS (Remote Authentication Dial-in User Services) and Diameter authentication, Network Access Server (NAS); or the like, of macro network platform 1810 to ensure secure network operation and data integrity in addition to authorization and authentication procedures that CS gateway node(s) 1812 and PS gateway node(s) 1818 can enact. Moreover, server(s) 1814 can provision services from external network(s), e.g., WAN 1850, or Global Positioning System (GPS) network(s), which can be a part of enterprise NW(s) 1880. It is to be noted that server(s) 1814 can include one or more processor configured to confer at least in part the functionality of macro network platform 1810. To that end, the one or more processor can execute code instructions stored in memory 1830, for example.

In example wireless environment 1800, memory 1830 stores information related to operation of macro network platform 1810. Information can include business data associated with subscribers; market plans and strategies, e.g., promotional campaigns, business partnerships; operational data for mobile devices served through macro network platform; service and privacy policies; end-user service logs for law enforcement; and so forth. Memory 1830 can also store information from at least one of telephony network(s) 1840, WAN 1850, SS7 network 1860, enterprise NW(s) 1870, or service NW(s) 1880.

Memory 1830 can retain additional information relevant to operation of the various components of macro network platform 1810. For example, operational information that can be stored in memory 1830 can comprise, but is not limited to, subscriber intelligence; contracted services; maintenance and service records; femtocell configuration (e.g., devices served through RAN 1872; authorized subscribers associated with one or more deployed femto APs); service policies and specifications; privacy policies; add-on features; so forth. Memory 1830 also can embody one or more of a home location register, a visitor location register, a subscriber database, portions of storage elements associated with external networks 1840-1880, mass storage for backend systems, or the like.

Aspects, features, or advantages of the subject application described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, LTE Advanced. Additionally, substantially all aspects of the subject application as disclosed in the subject specification can be exploited in legacy telecommunication technologies; e.g., GSM.

As it employed in the subject specification, the term "processor" or "processing unit" can refer to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification also can be implemented through program modules stored in a memory (e.g., memory 735 or memory 285) and executed by a processor (e.g., processor(s) 745), or other combination of hardware and software, or hardware and firmware. The term "article of manufacture" as used herein is intended to encompass a computer program accessible from any computer-readable device, carrier, or media. For example, computer-readable media can include but are not limited to including magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject application. It is, of course, not possible to describe every conceivable combination of components or methodologies for purposes of describing the subject application, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    based on a first determination that first channel state information of a first receiver operating in a multiple-input multiple-output mode satisfies a first defined signal quality condition representing a reduction in a quality of a communication channel, configuring, by a mobile device comprising a processor, the first receiver to operate in a multiple-input single-output mode; and
    in response to the configuring the first receiver, sending, by the mobile device using asymmetric multicarrier spreading, a communication directed to an access point device via a first portion of an electromagnetic radiation spectrum using the first receiver and via a second portion of the electromagnetic radiation spectrum using a second receiver.

2. The method of claim 1, further comprising:
    based on a second determination that second channel state information of the first receiver satisfies a second defined signal quality condition representing an increase in the quality of the communication channel, configuring, by the mobile device, the first receiver to operate in the multiple-input multiple-output mode.

3. The method of claim 1, further comprising:
sending, by the mobile device, the first channel state information directed to the access point device.

4. The method of claim 3, wherein the configuring comprises:
in response to the sending, receiving, by the mobile device, an instruction from the access point device directing the mobile device to provision the first receiver to operate in the multiple-input single-output mode.

5. The method of claim 1, wherein the reduction in the quality of the communication channel represents a reduction in a signal quality of a pilot signal.

6. The method of claim 1, wherein the first determination comprises a probe of an overload condition associated with a saturation of an amplifier of the first receiver.

7. A user equipment, comprising:
a processor; and
a memory that stores executable instructions that, when executed by the processor, facilitate performance of operations, comprising:
based on a quality of a signal being determined, via a first receiver of the user equipment operating in a multiple-input multiple-output mode, to satisfy a first defined condition representing a decrease in a quality of the signal, configuring the first receiver to operate in a multiple-input single-output communication mode; and
sending, using asymmetric multicarrier spreading, a communication using a first portion of an electromagnetic spectrum via the first receiver and a second portion of the electromagnetic spectrum via a second receiver.

8. The user equipment of claim 7, wherein the signal comprises a pilot signal.

9. The user equipment of claim 7, wherein the first defined condition corresponds to a saturation of an amplifier of the first receiver.

10. The user equipment of claim 7, wherein the operations further comprise:
based on the quality of the signal, as a result of the first receiver operating in the multiple-input single-output communication mode, being determined to satisfy a second defined condition representing an increase in the quality of the signal, configuring the first receiver to operate in the multiple-input multiple-output mode.

11. The user equipment of claim 7, wherein the first portion of the electromagnetic spectrum comprises a wide band of frequencies comprising a sub-band of frequencies adjacent to a frequency block utilized for broadcast of a wireless signal, and wherein the wide band of frequencies comprises a first range of frequencies that is greater than a second range of frequencies of a narrow band narrower than the wide band.

12. The user equipment of claim 11, wherein the second portion of the electromagnetic spectrum comprises the narrow band, and wherein the narrow band spectrally overlaps the wide band.

13. The user equipment of claim 11, wherein the operations further comprise:
conveying a group of radio link conditions representing the quality of the signal to a base station device.

14. The user equipment of claim 13, wherein the configuring comprises:
in response to the conveying, receiving, from the base station device, an instruction from the base station device directing the user equipment to configure the first receiver to operate in the multiple-input single-output communication mode.

15. A non-transitory machine-readable storage medium, comprising executable instructions that, when executed by a processor of a mobile device, facilitate performance of operations, comprising:
based on a first determination that a quality of a pilot signal of a first receiver of the mobile device satisfies a first defined condition, changing an operation of the first receiver from a multiple-input multiple-output mode to a multiple-input single-output mode; and
sending a communication using asymmetric multicarrier spreading comprising sending respective portions of an electromagnetic radiation spectrum of the communication using the first receiver and a second receiver of the mobile device.

16. The non-transitory machine-readable storage medium of claim 15, wherein the defined condition corresponds to an overload condition associated with saturation of an amplifier of the first receiver.

17. The non-transitory machine-readable storage medium of claim 16, wherein the operations further comprise:
determining the overload condition by evaluating an overload criterion that is based on a channel state information threshold that distinguishes the overload condition from a non-overload condition.

18. The non-transitory machine-readable storage medium of claim 16, wherein a portion of the respective portions of the electromagnetic radiation spectrum of the communication that has been received by the second receiver is unaffected by the overload condition.

19. The non-transitory machine-readable storage medium of claim 15, wherein the operations further comprise:
based on a second determination that the quality of the pilot signal satisfies a second defined condition, different from the first defined condition, changing the operation of the first receiver from the multiple-input single-output mode to the multiple-input multiple-output mode.

20. The non-transitory machine-readable storage medium of claim 15, wherein the operations further comprise:
in response to sending information representing the quality of the pilot signal to an access point device, receiving, from the access point device, an instruction for facilitating the changing of the operation of the first receiver.

* * * * *